May 3, 1927.

F. H. STEWART 1,627,212

APPARATUS FOR BUILDING TIRE CASINGS

Filed June 10, 1924     23 Sheets-Sheet 1

Inventor
Frank H. Stewart

By Attorney

May 3, 1927.  1,627,212
F. H. STEWART
APPARATUS FOR BUILDING TIRE CASINGS
Filed June 10, 1924   23 Sheets-Sheet 2
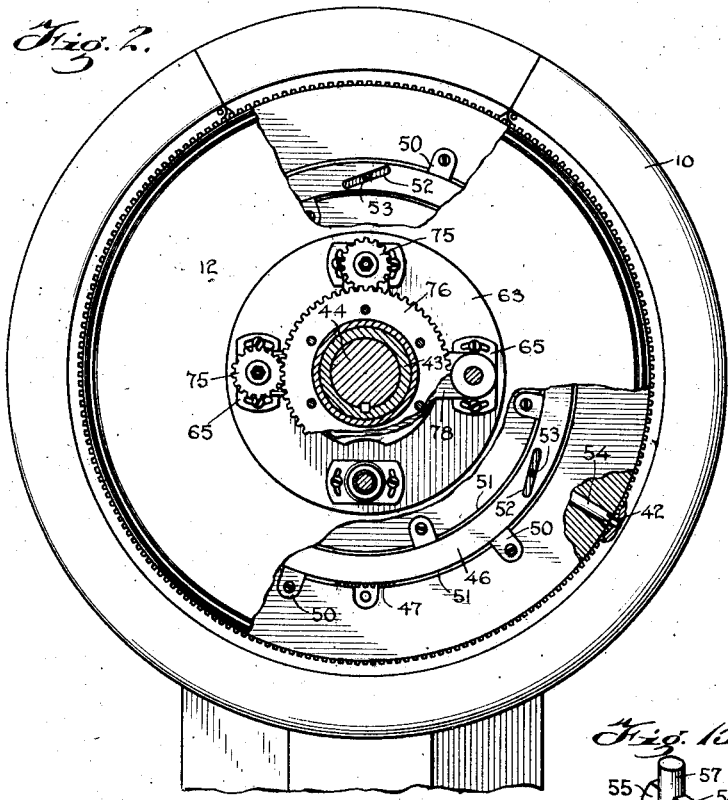
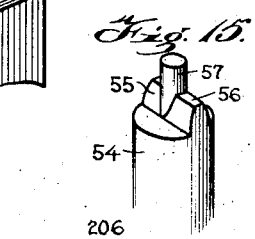
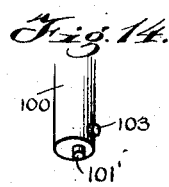
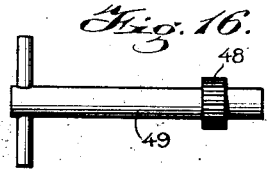
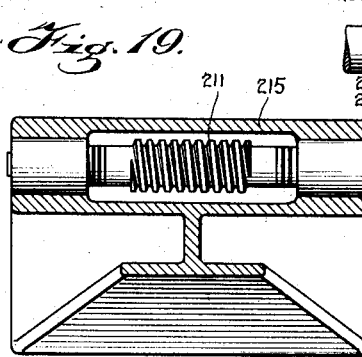
Inventor
Frank H. Stewart May 3, 1927.  
F. H. STEWART  
1,627,212  
APPARATUS FOR BUILDING TIRE CASINGS  
Filed June 10, 1924   23 Sheets-Sheet 3
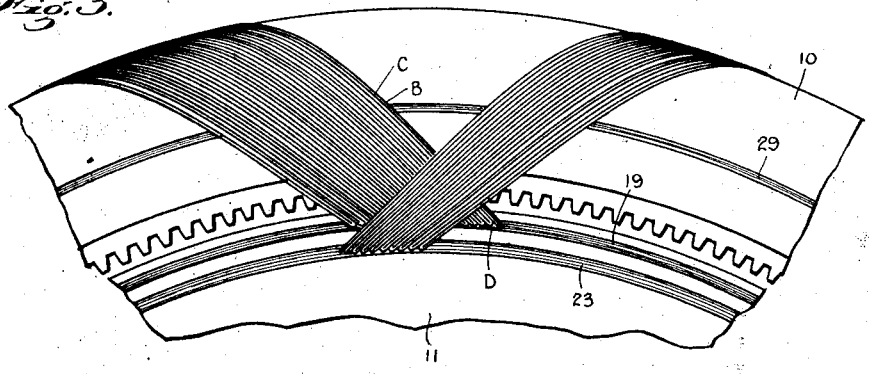
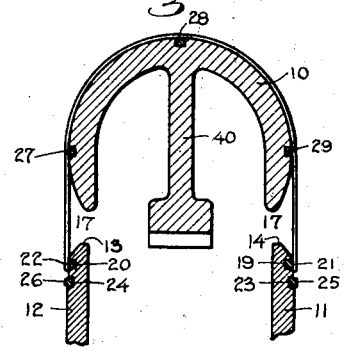
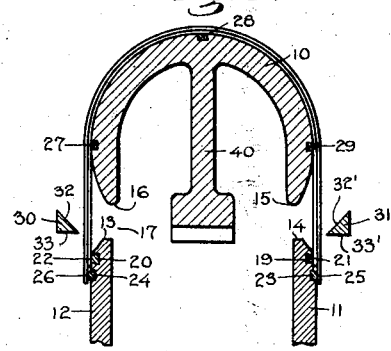
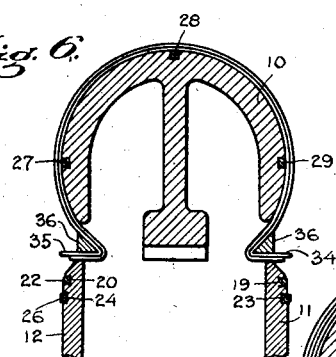
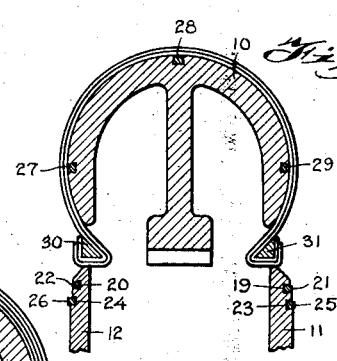
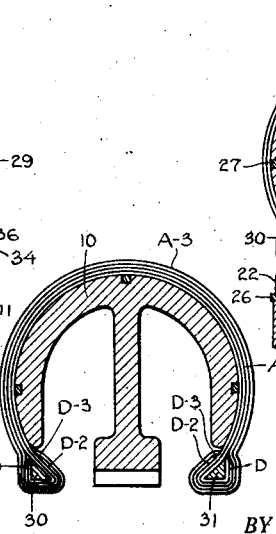
INVENTOR.  
Frank H. Stewart  
BY  
ATTORNEY.

May 3, 1927. 1,627,212
F. H. STEWART
APPARATUS FOR BUILDING TIRE CASINGS
Filed June 10, 1924 23 Sheets-Sheet 4
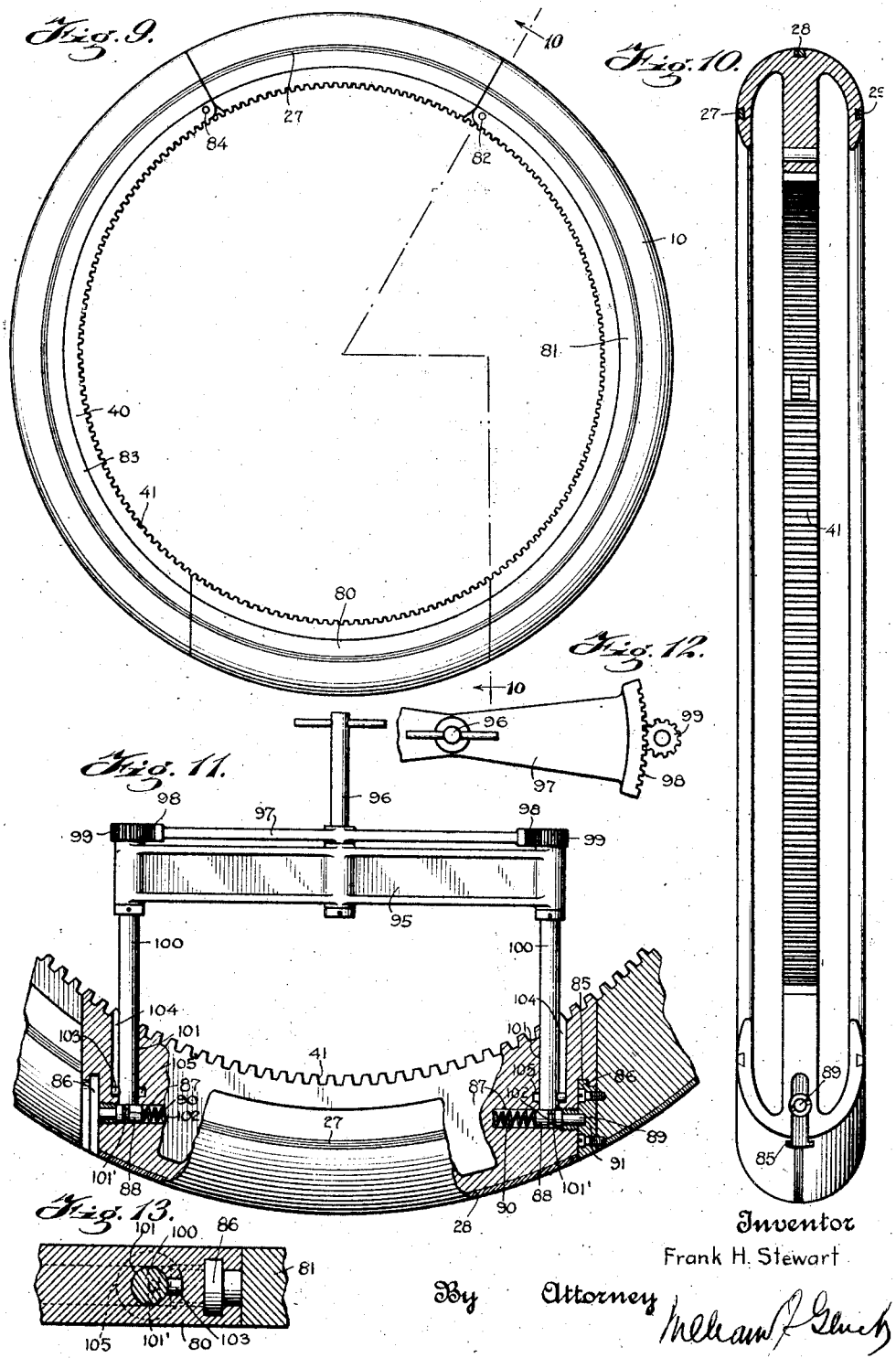
Inventor
Frank H. Stewart
By Attorney

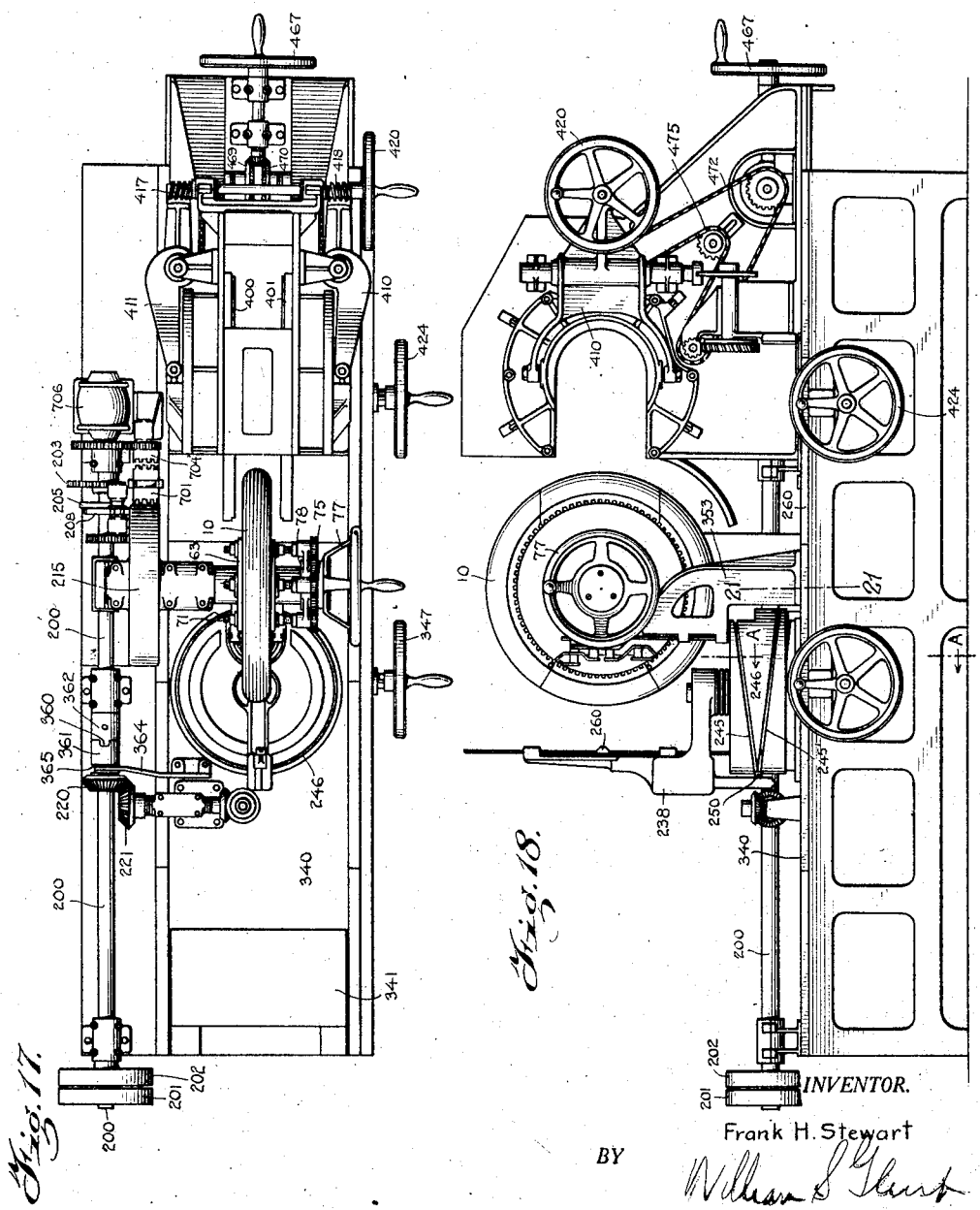

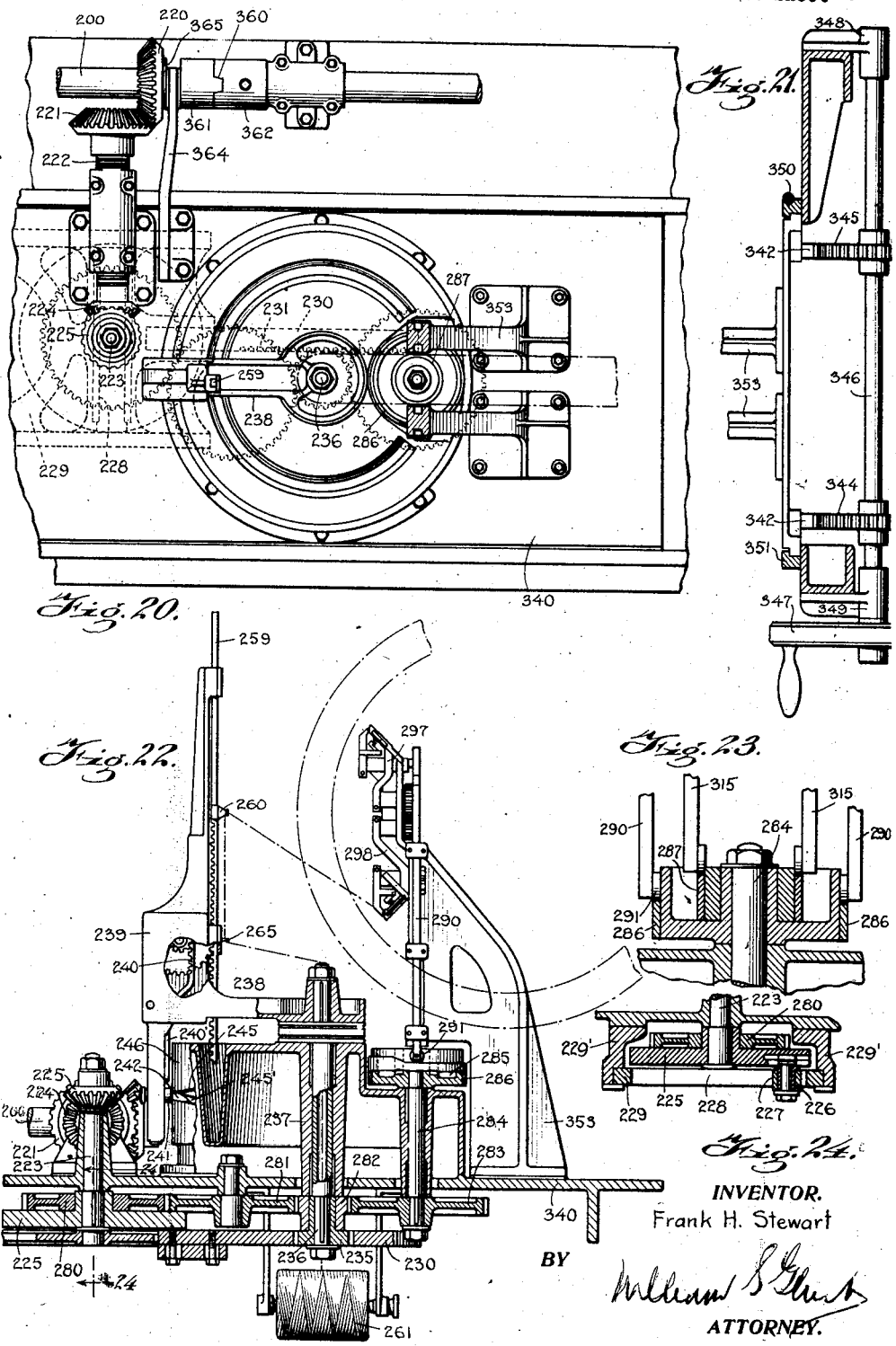

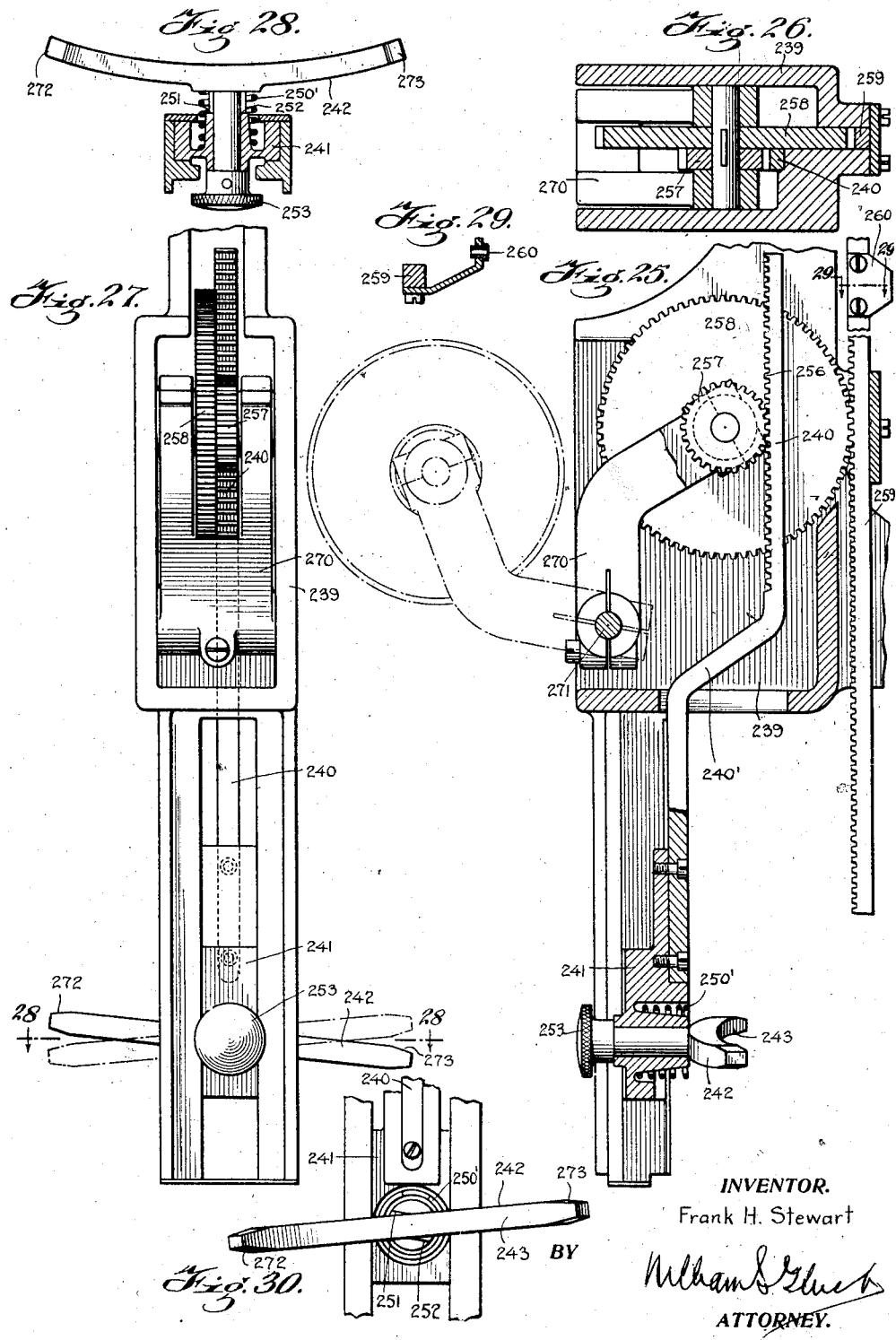

May 3, 1927.
F. H. STEWART
1,627,212
APPARATUS FOR BUILDING TIRE CASINGS
Filed June 10. 1924    23 Sheets-Sheet 8
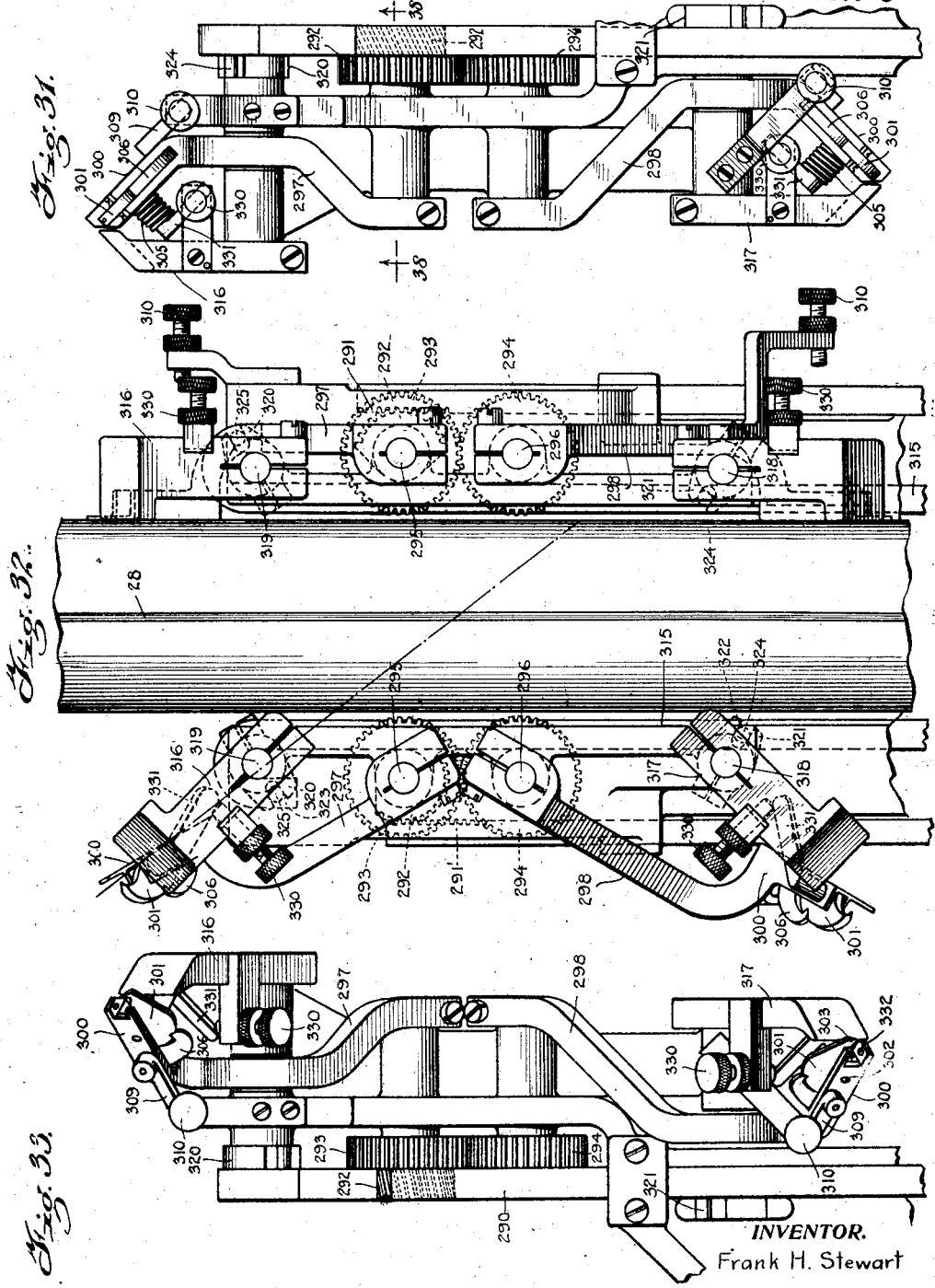
INVENTOR.
Frank H. Stewart
BY
ATTORNEY.

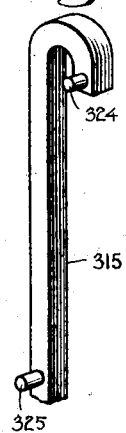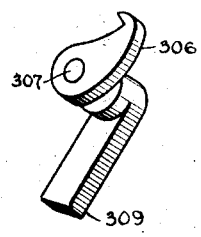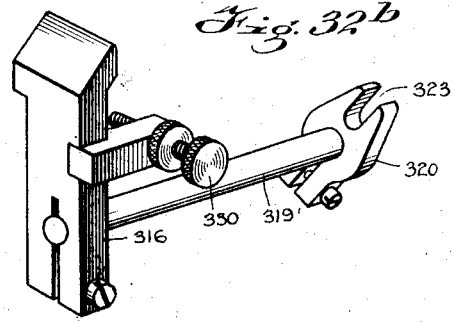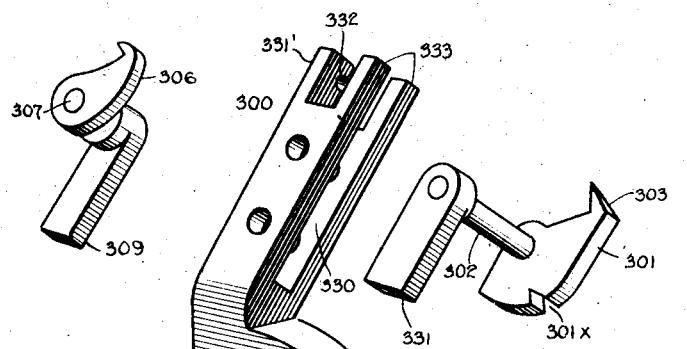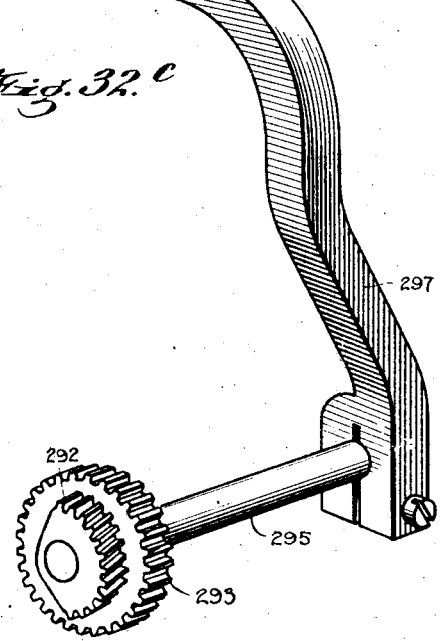

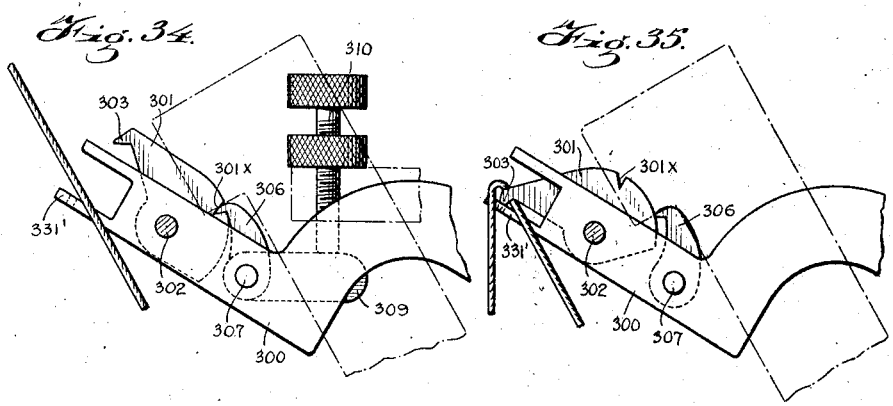
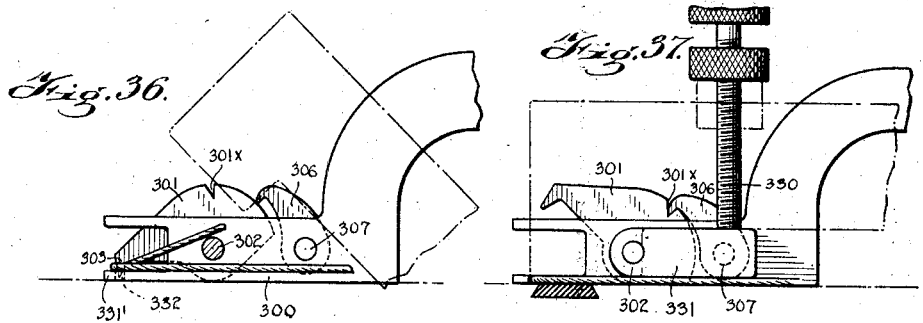
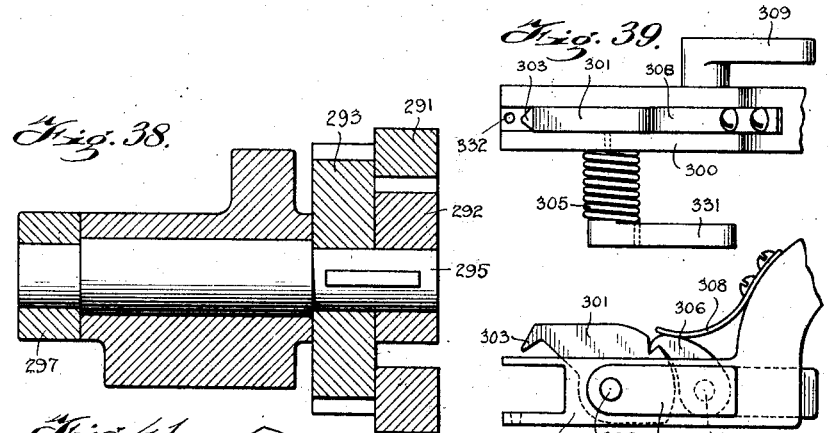
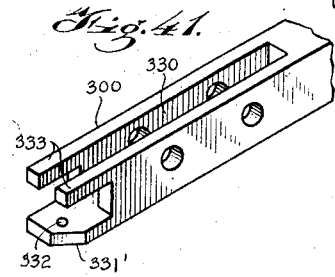

May 3, 1927.
F. H. STEWART
1,627,212
APPARATUS FOR BUILDING TIRE CASINGS
Filed June 10, 1924   23 Sheets-Sheet 11
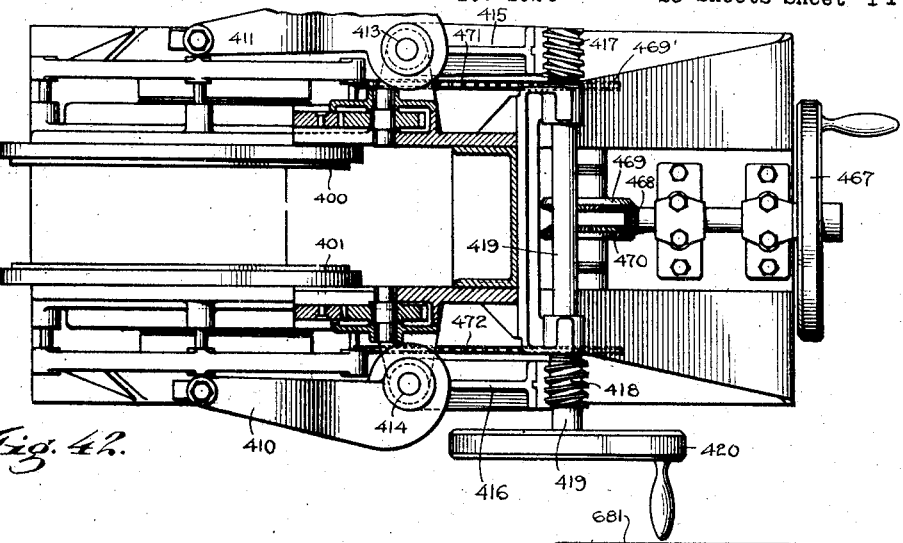
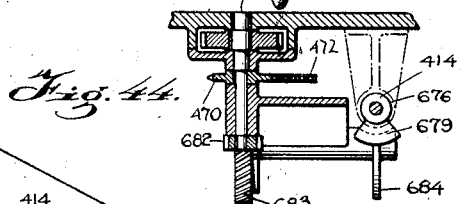
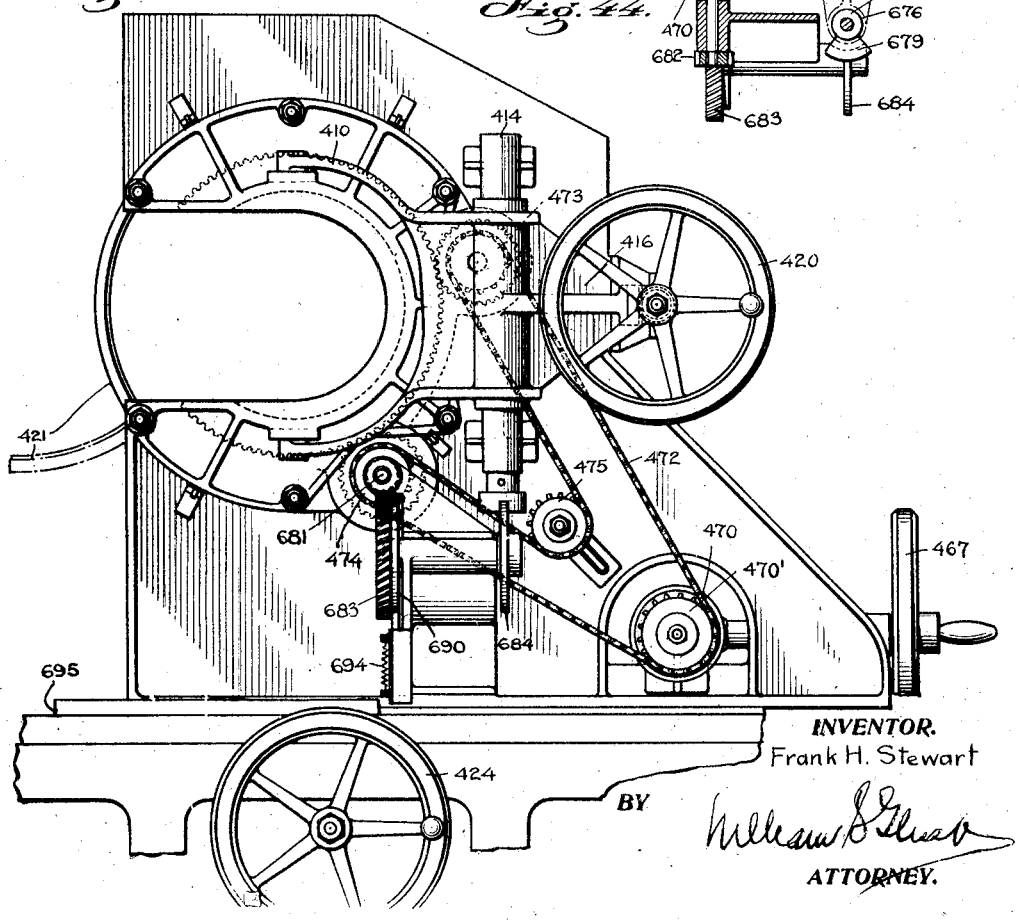
INVENTOR.
Frank H. Stewart
BY
ATTORNEY.

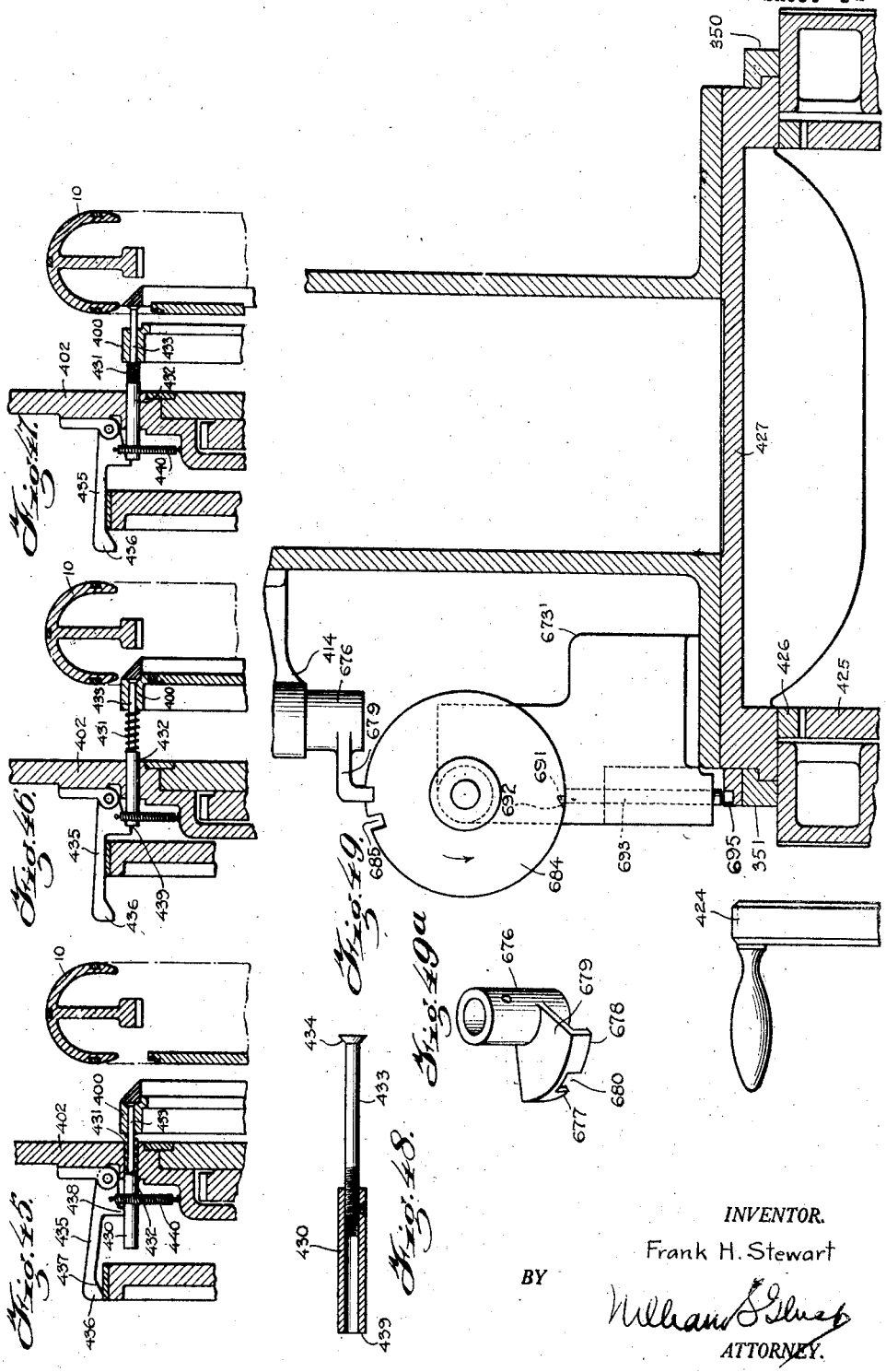

May 3, 1927.
F. H. STEWART
1,627,212
APPARATUS FOR BUILDING TIRE CASINGS
Filed June 10, 1924 23 Sheets-Sheet 13
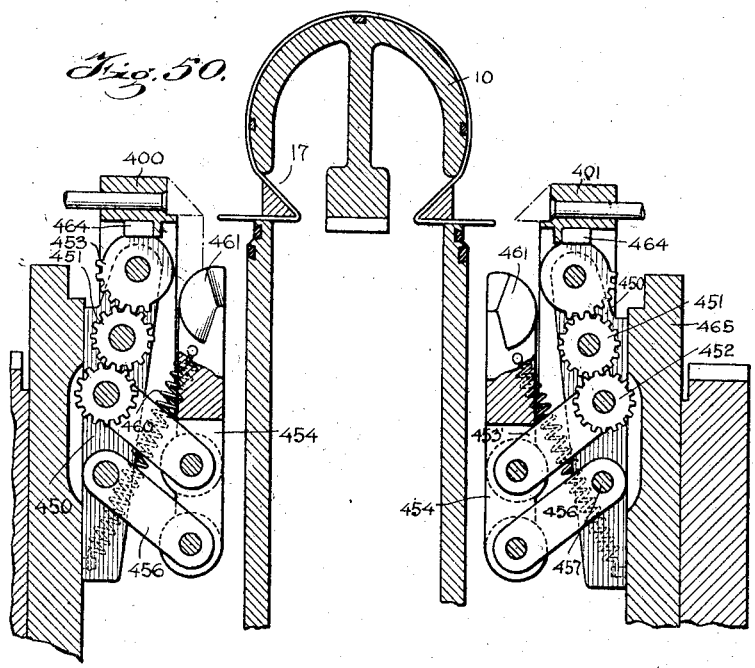
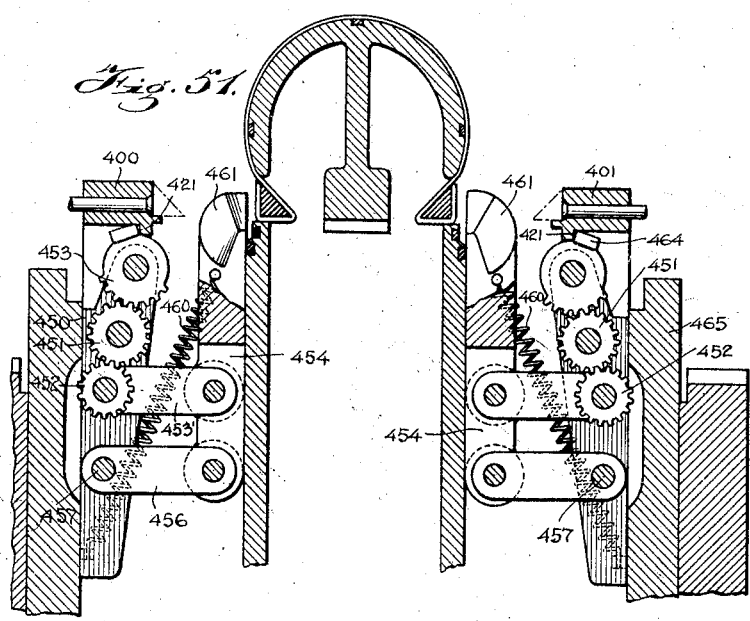
INVENTOR.
Frank H. Stewart
BY
ATTORNEY.

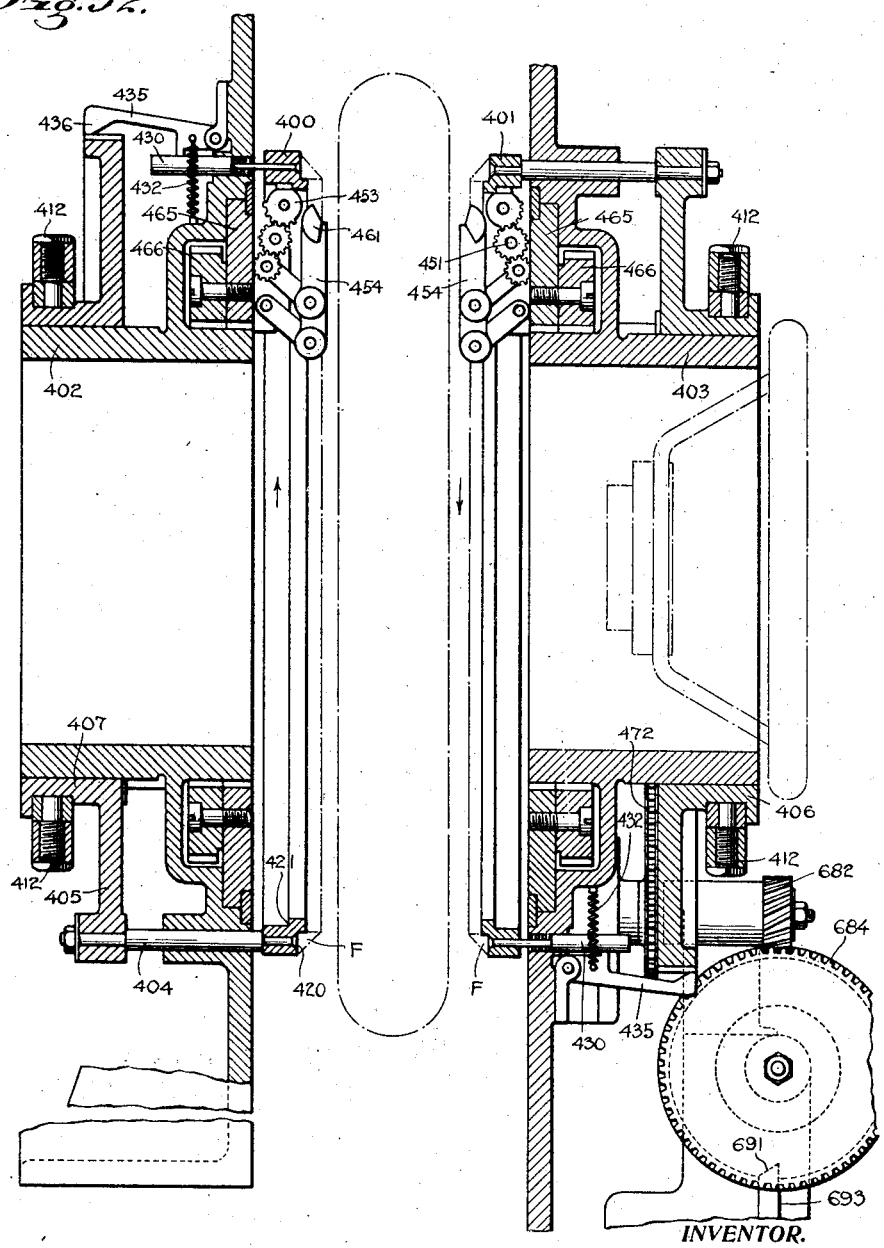

INVENTOR.
Frank H. Stewart

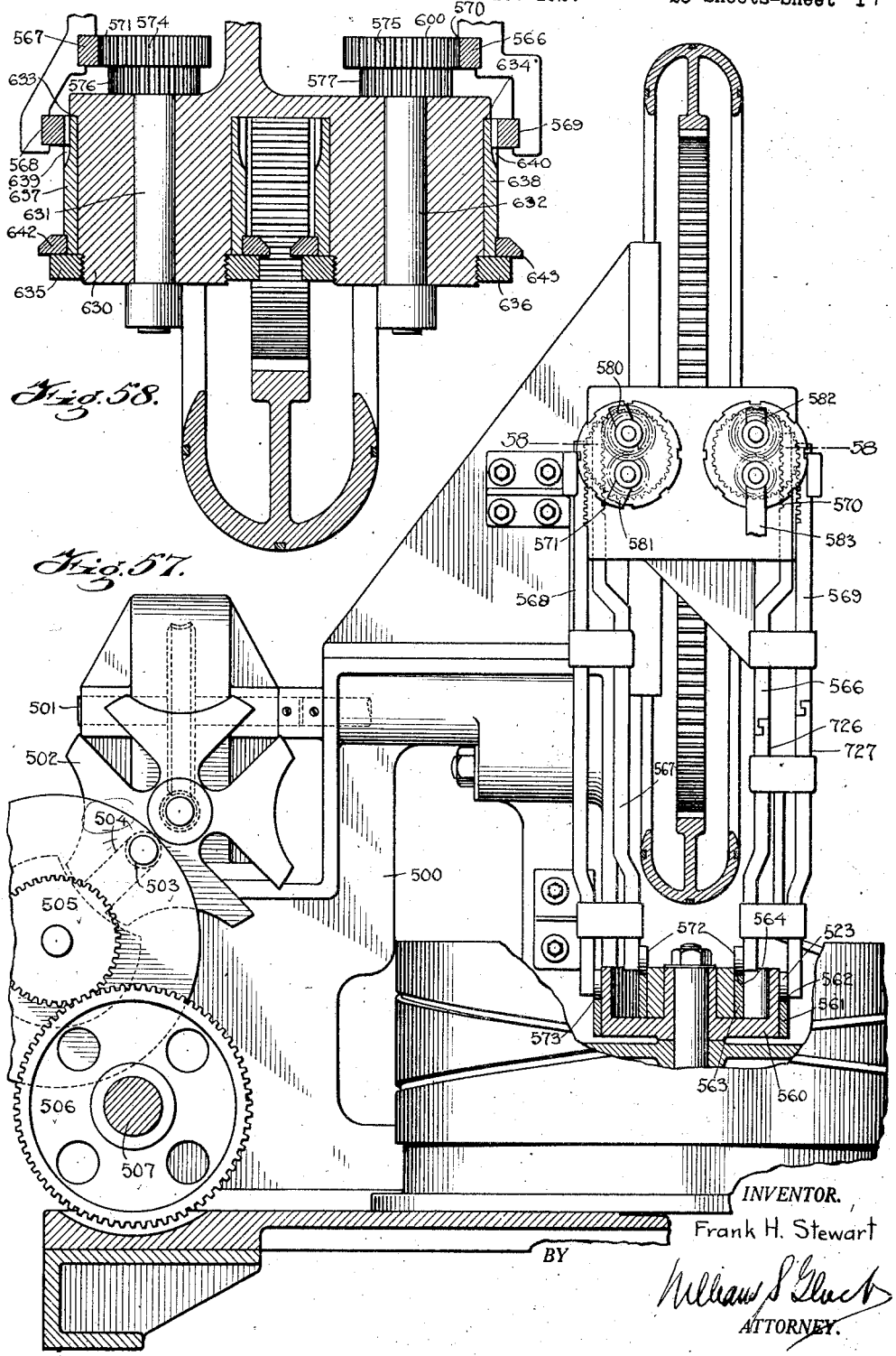

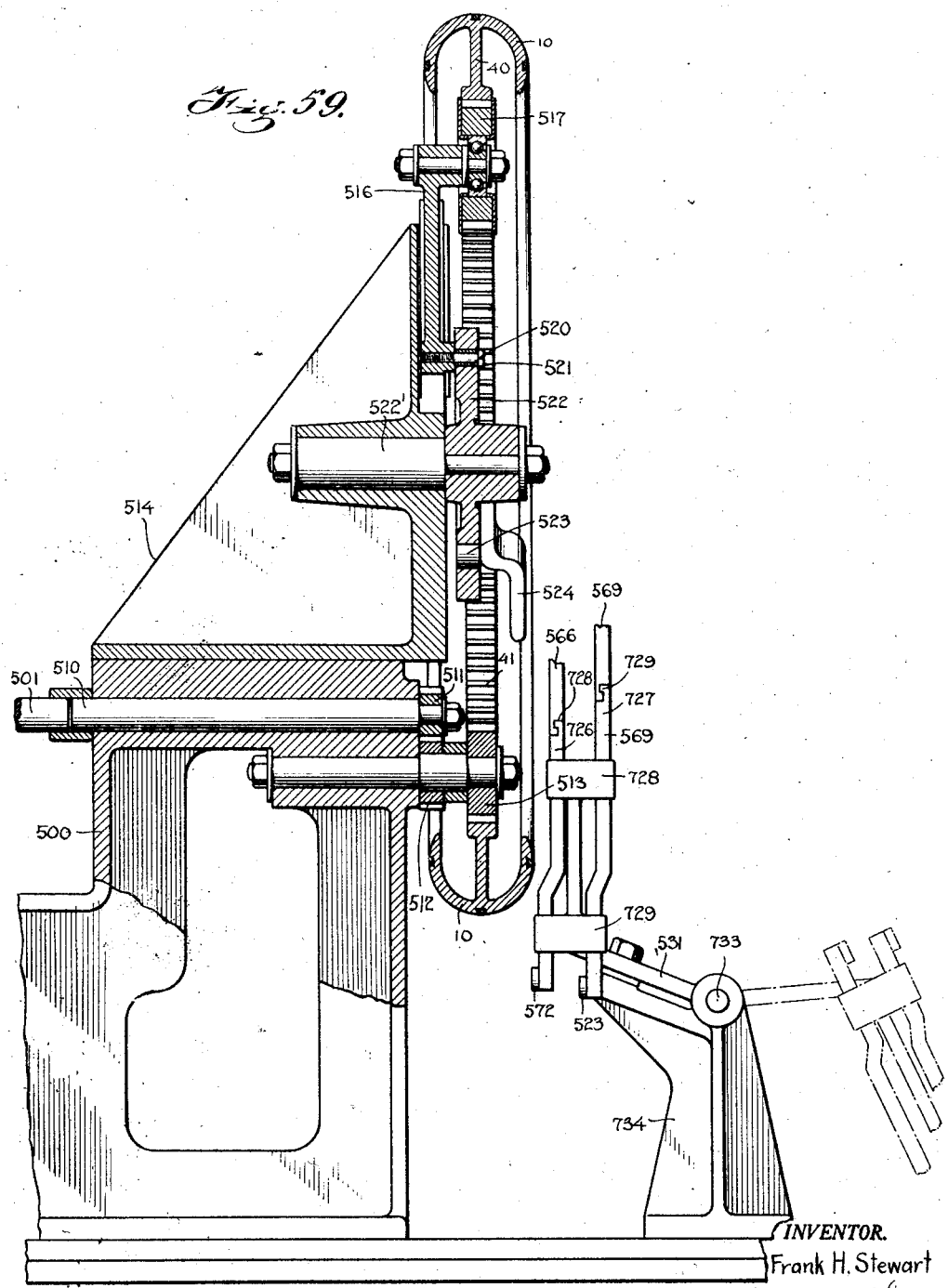

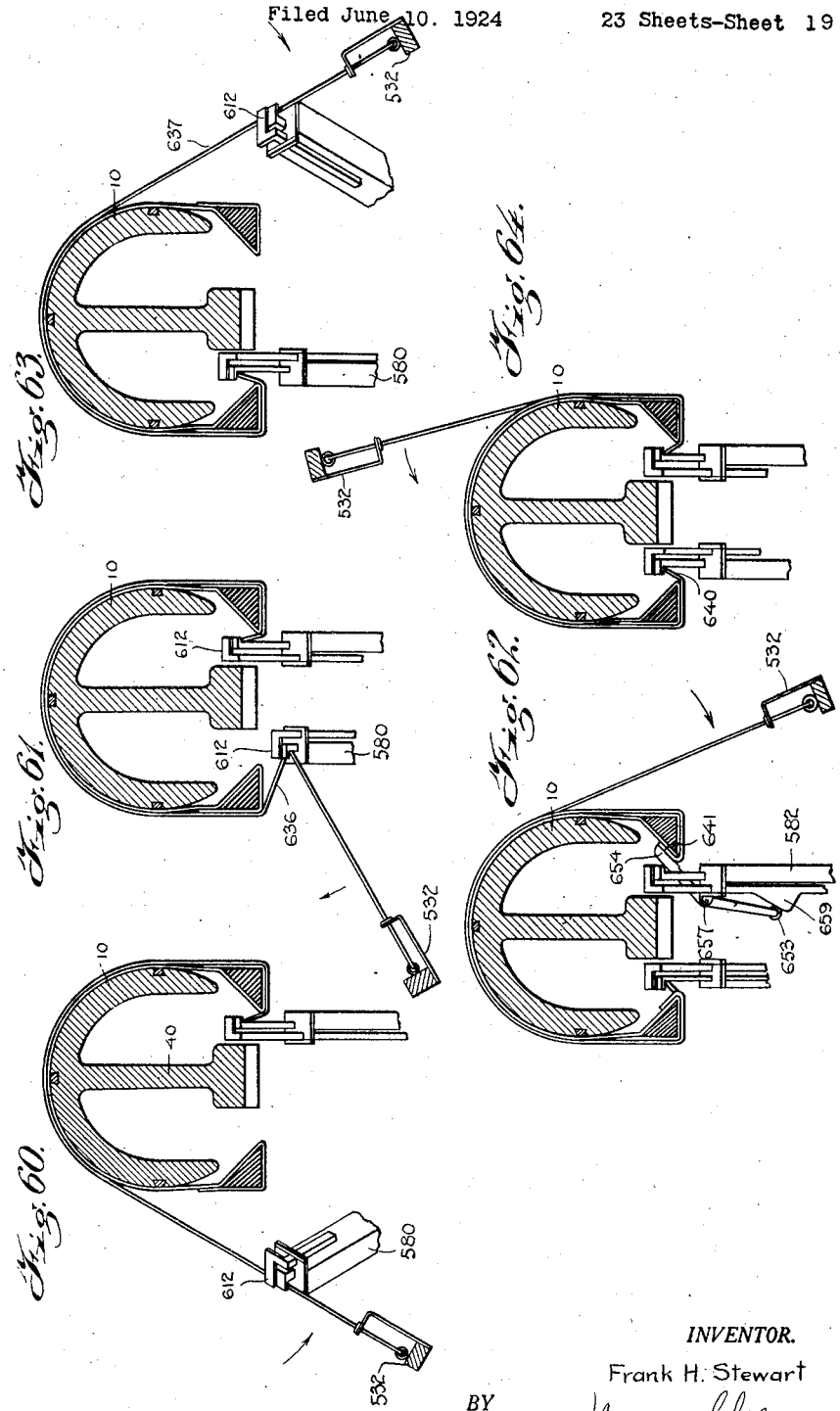

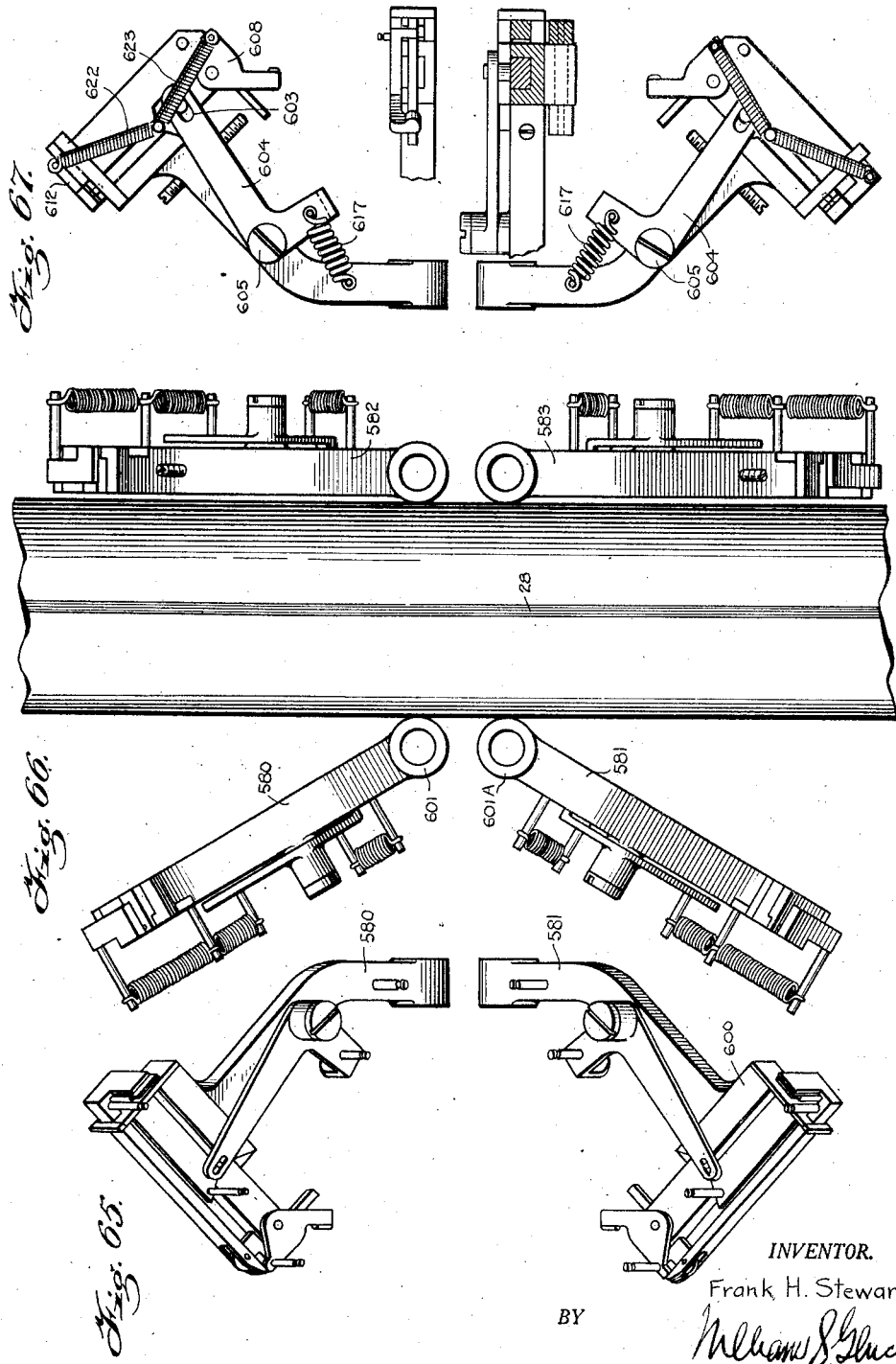

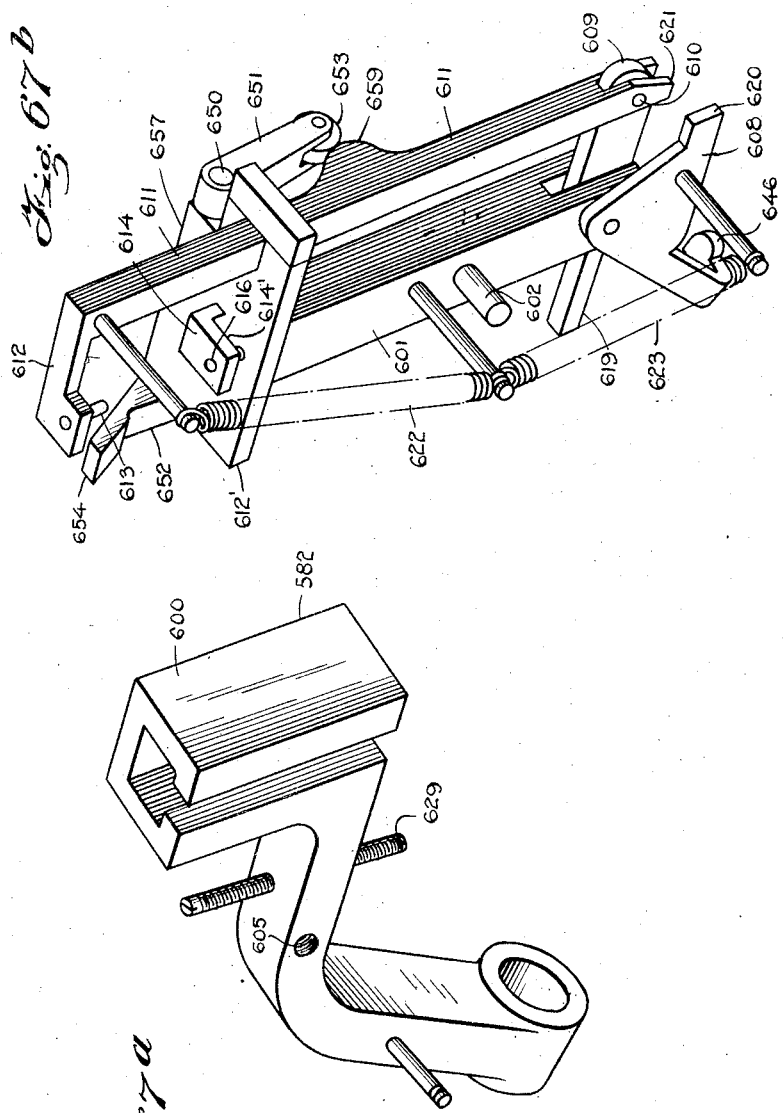

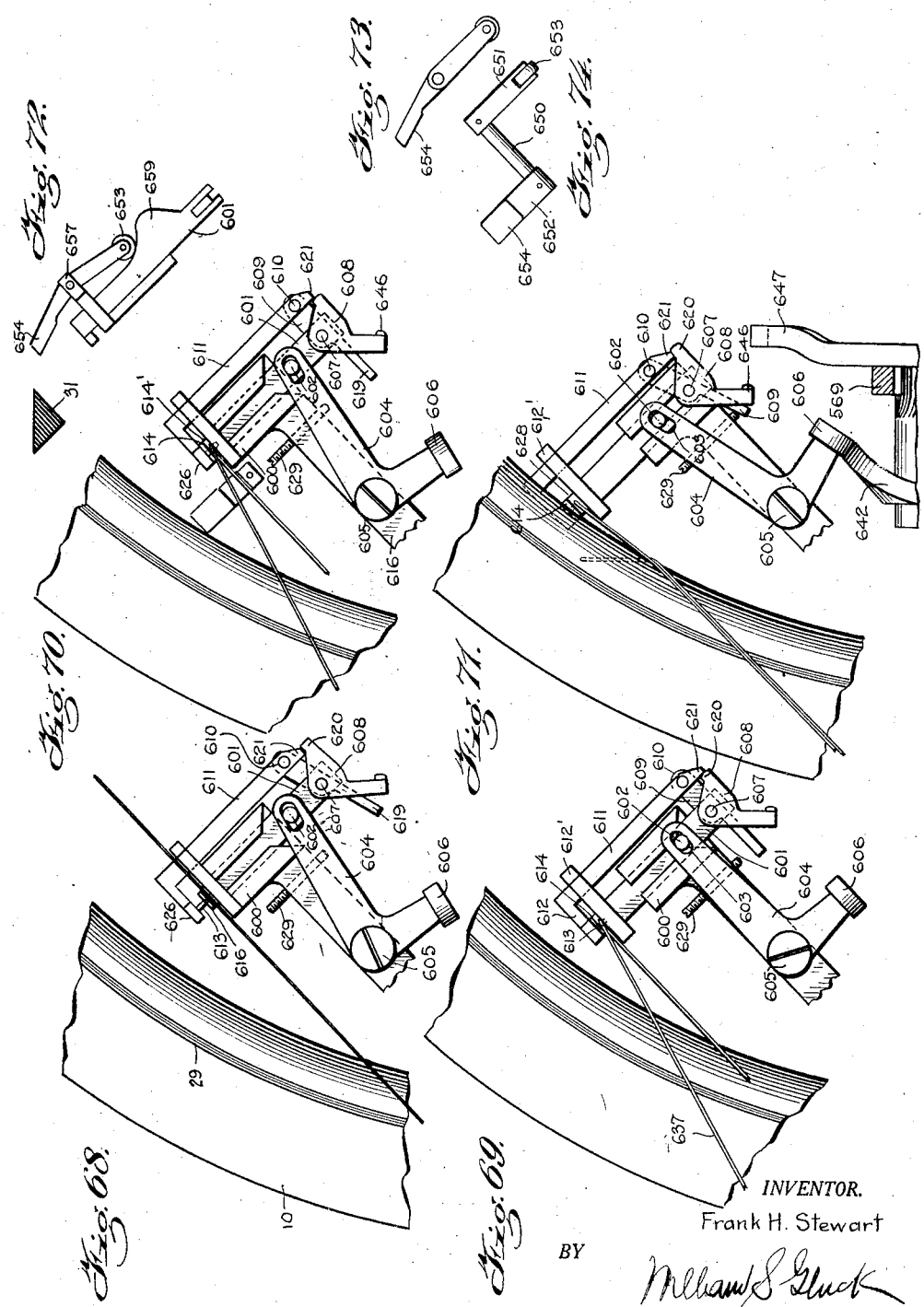

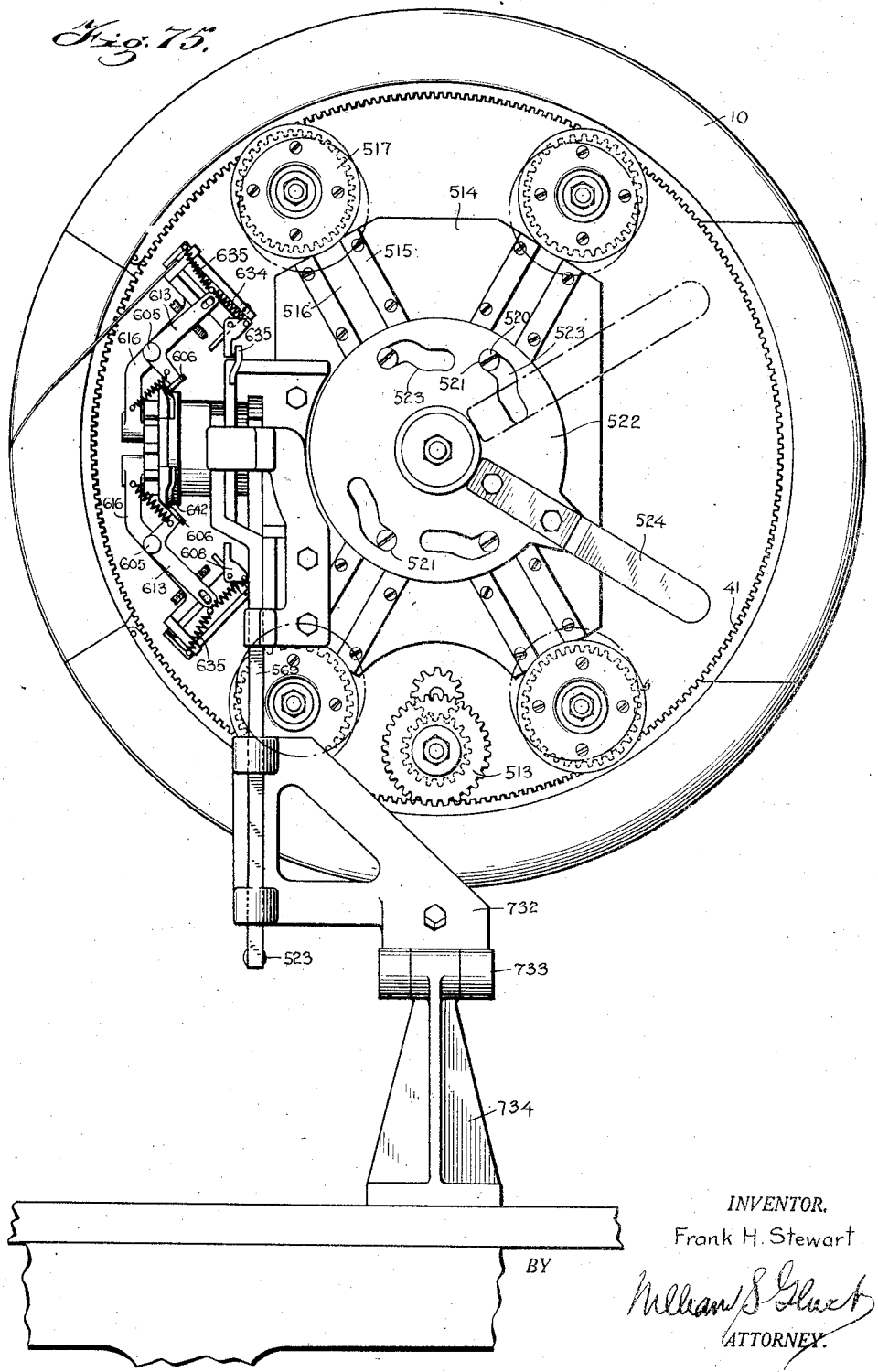

Patented May 3, 1927.

1,627,212

UNITED STATES PATENT OFFICE.

FRANK H. STEWART, OF PHILADELPHIA, PENNSYLVANIA, ASSIGNOR TO LOUIS B. EPPSTEIN, JEROME WILZIN, AND J. B. GORDATOWSKI, ALL OF NEW YORK, N. Y., SYNDICATE MANAGERS OF THE CUM-ART SYNDICATE, OF NEW YORK, N. Y.

APPARATUS FOR BUILDING TIRE CASINGS.

Application filed June 10, 1924. Serial No. 719,101.

This invention relates generally to the building of a casing for a tire such as is commonly used upon automobiles and which is in the form of an elastic shoe within which is to be placed an inflated tube and more specifically to the building of a carcass or fabric for such casing of individual cords or cord sections.

Shoes or casings of the character referred to are subject to stresses and strains of various characters and these divide themselves generally into two classes (first) those stresses and strains which are distributed throughout the casing and (secondly) those stresses and strains which are, or which might be, termed local, i. e., are the result of forces particularly effective upon certain portions of the casing or shoe incident either to its character and contour or incident to the point at which, or the manner in which, the force is applied thereto, or to the magnitude of the force.

To meet the first of these conditions, i. e., the general stresses and strains which are distributed throughout the casing, the ideal to be attained is an absolutely uniform distribution of this strain throughout the different elements that go to make up the casing, since, like a chain, a tire is no stronger than its weakest element. Where the elements of the tire are in the form of cords laid adjacent to each other as in the embodiment herein illustrated, the general strain should be provided for by the use of a uniform cord placed under a uniform tension and having its ends unifromly positioned and anchored, each of which factors should be as efficient as is consistent with practical manufacturing and commercial considerations.

The second of these conditions, namely, the local strains and stresses, such as occur at the bead or as occur under impact as is incident to impacts with stones or braking, acceleration, deceleration, skidding or steering of the vehicle, are provided for (first) by giving each of the factors referred to a wide margin of safety and (secondly) by eliminating from the process and form the article produced thereby such steps or features as give rise to elements of weakness.

The elements of weakness, at times amounting to defects in the fabrics, are incident to one or more, among others, of the following factors in the laying of the cords: (1) that the cord terminals are imperfectly or insufficiently anchored; (2) that the tension of the individual cords is not sufficient; (3) that the tension on the different cords is not uniform; (4) that the positional relationship of the cord is not maintained as laid; (5) that the manner of laying the cords introduces elements of friction or stresses, such as crossing the threads in the same layer, which in use weakens the structure as a whole.

Broadly stated, the object of my invention is the quantity production of cord tires from a minimum amount of material and at a minimum unit labor cost, which tires will have eliminated therefrom, to a great extent, all elements of weakness.

Among the more important provisions of my invention are: the provision of a method for building a tire casing from cord sections whereby the initial tension given the cord sections is maintained by the application with pressure of the cord section terminals directly to the apparatus about which the casing is being formed; the provision of a method of building a tire casing from cord sections, whereby the initial tension given the cord sections about a core is maintained by anchoring the cord section terminals to a part of the apparatus spaced from the core, and more particularly by having the cord sections unsupported for a part of a length; the provision of an apparatus for building a tire casing, the cord sections comprising a mandrel core and mandrel walls spaced from the mandrel core; the provision of a method for building a tire casing from cord sections whereby the initial tension given to the cord sections is maintained by anchoring the terminals thereof and a final tension given thereto by the application of force at a point inside of said points of anchorage; and more particularly in a direction transversely thereof; the provision of a method for building a tire casing from cord sections whereby the initial tension given to the cord sections is maintained by anchoring the terminals thereof, and such anchorages released by the application of pressure inside the anchored terminals; the provision of a method for building a tire casing from cord sections whereby the initial tension given the cord sections about a core is maintained by anchoring the cord sections at a point spaced from the core and applying pressure to the cord sections opposite the space between the core and said points of anchorage; the provision of a method for building a tire casing from cord sections which includes the step or steps of anchoring the cord sections at their terminals and at points intermediate such terminals; the provision of a method for building a tire casing from cord sections which includes the step or steps of anchoring a cord section to the core at points intermediate the terminals thereof; the provision of a method for building a tire casing from cord sections whereby the initial tension under which the cord sections are laid is increased by the movement of the bead ring transversely thereof; the provision of a method for building a tire casing from cord sections whereby the cord section terminals are caused to automatically engage about the bead ring upon a relative movement between the bead ring and the cord section terminals; the provision of a method for building a tire casing from superposed layers of cord sections whereby the cord section terminals of one layer are anchored at points removed from the points of anchorage of another layer; the provision of a method for building a tire casing from superposed layers of cord sections whereby the cord section terminals of one layer are anchored at points further removed from the apex of the perimeter of the core about which the cord sections are laid; the provision of a method for building a tire casing from superposed layers of cord sections whereby the cord section terminals of one layer are anchored at points further removed from the plane of the side walls of the core about which the cord sections are laid; the provision of a method for building a tire casing from superposed layers of cord sections whereby the cord section terminals of a lower layer are anchored at points removed from the points of anchorage of the cord sections of a layer superimposed thereon; the provision of a method for building a tire casing from superposed layers of cord sections whereby the terminals of one layer are wrapped around the bead in one direction, and the terminals of another layer wrapped thereabout in the reverse direction; the provision of a new and improved form of collapsible mandrel and of a new and improved arrangement for assisting in the collapsing thereof; the provision of a mandrel former for cord tires comprising a mandrel core and mandrel walls shiftable relatively thereto; the provision of an apparatus whereby my improved method can be employed, and the provision generally of a new method for building a tire casing from a cord or cord sections, and of an apparatus whereby such method can be employed and of a new and improved fabric for tire casings whereby an improved casing can be produced at a minimum cost of labor and of material.

For the purpose of attaining these objects and such other objects as may hereinafter appear or be pointed out, I have illustrated the successive steps of a manner of carrying my invention into effect in connection with one embodiment of the apparatus which I may employ in the drawings, wherein—

Fig. 1 is a section through the mandrel assembly and its manner of operation;

Fig. 2 is a view partly in elevation and partly in section taken on the line 2—2 of Fig. 1, looking in the direction of the arrows with part of the apparatus broken away.

Fig. 3 illustrates the manner of laying superposed layers of cords or cord sections on a fragmentary portion of the mandrel core and mandrel walls;

Fig. 4 illustrates the first step in the laying of the cords in which the cord sections are given an initial tension and anchored so as to maintain this tension;

Fig. 5 illustrates the manner of laying a succeeding layer of cord sections and also the position of the bead rings as they are about to be applied;

Fig. 6 illustrates the bead rings after they have been caused to assume their final positional relationship to the layers;

Fig. 7 illustrates the completion of the association between the bead rings and the layers of cord sections;

Fig. 8 illustrates a superposition of additional layers upon the associated bead rings and cord layers as illustrated in Fig 7;

Fig. 9 is a side elevational view of the mandrel former or core;

Fig. 10 is a transverse section therethrough;

Fig. 11 is an enlarged view partly in section, showing the removal part of the mandrel core and the mechanism for assisting in its removal;

Figs. 12, 13, 14, 15 and 16 are views of details;

Fig. 17 is a top plan view looking down upon what will hereinafter be referred to as unit B of the apparatus;

Fig. 18 is an elevational view looking at Fig. 17 from the right;

Fig. 19 is a view of the mechanism for driving the mandrel shaft, taken at 19—19 Fig. 1.

Fig. 20 is a top plan view of the cord laying and presser foot mechanism of unit B;

Fig. 21 is a section view taken at AA Fig. 18;

Fig. 22 is a side elevational view partly in section of the mechanism of Fig. 20;

Figs. 23 and 24 are sections of details of the cord laying and presser foot mechanism of unit B;

Figs. 25, 26, 27, 28, 29 and 30 illustrate the mechanism for giving the cord laying needle its traverse across the mandrel core for laying the cords back and forth thereacross;

Figure 53:
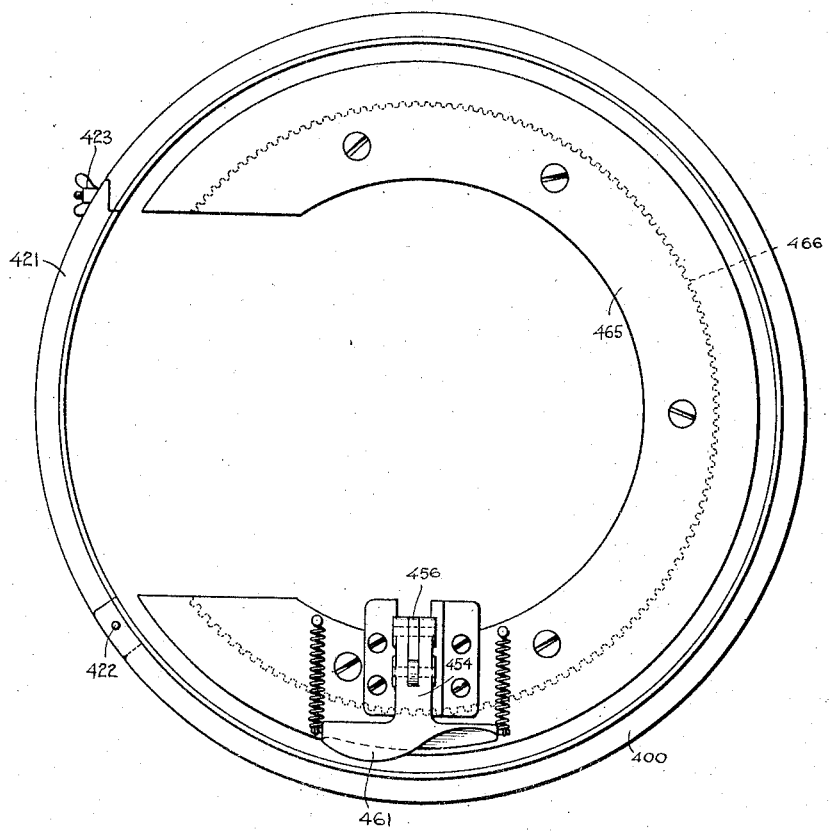
Figure 54:
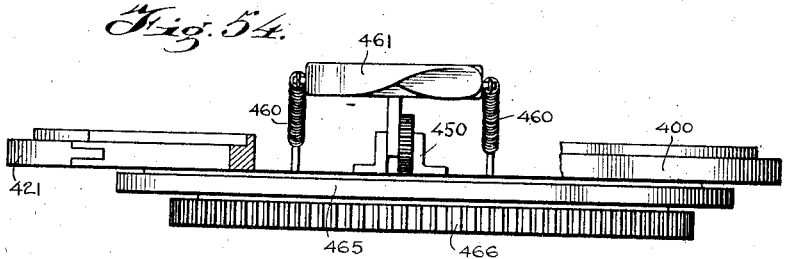
Figure 55:
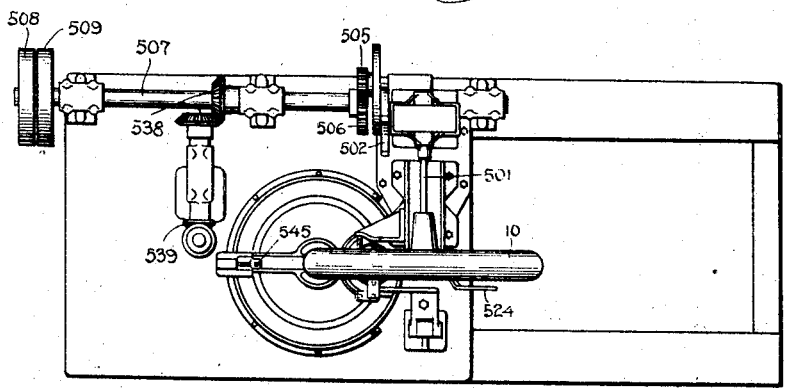
Figure 56:
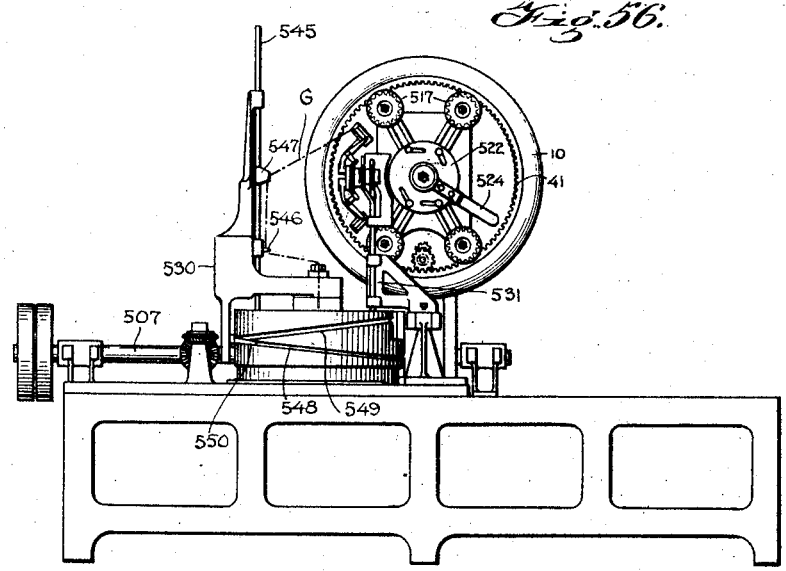

Figs. 31 to 41 inclusive, are views of the presser foot and pick finger mechanism of unit B and of the detailed construction thereof, showing the manner in which the cord laid across the mandrel by the mechanism of Fig. 22 is caused to be associated therewith in accordance with my method;

Figs. 42 and 43 are top plan and side elevational views of the bead applying mechanism and of its manner of support;

Fig. 44 is a sectional view through a detail;

Figs. 45, 46, 47 and 48 are detail views showing the manner in which the beads are caused to be associated with the cord fabric;

Fig. 49 is an enlarged detail of the safety attachment employed in connection with the bead laying mechanism;

Fig. 49^A is a detail of the safety mechanism of Fig. 49;

Figs. 50, 51 and 52 show on an enlarged scale the mechanism by which the cords are caused to be wrapped around the bead after the bead has been positioned in proper association therewith;

Figs. 53 and 54 show side elevational and top plan views, respectively, of the detail of such mechanism;

Figs. 55 and 56, respectively, are top plan and side elevational views of the thread laying and presser foot mechanism of the C unit and correspond to Figs. 20 and 22 of the B unit showing similar mechanism;

Fig. 57 is a view on an enlarged scale, partly broken away, of the presser foot and pick finger operating mechanism of unit C;

Fig. 58 is a section on an enlarged scale taken on line 58—58 of Fig. 57;

Fig. 59 is a section view of mandrel rotating mechanism, showing the manner in which the pick finger and presser foot mechanism can be moved out of the way when it is desired to remove the mandrel former with the carcass thereon;

Figs. 60 to 64, inclusive, are intended to illustrate the successive steps employed in laying additional layers upon the associated partly formed carcass and bead rings by the mechanisms of Figs. 55 to 59, inclusive;

Figs. 65, 66, 67, 67^A and 67^B show on an enlarged scale the detailed construction of the presser foot and pick finger mechanisms and the manner of their cooperation with the mandrel former;

Figs. 68, 69, 70 and 71 are fragmentary views showing the manner in which the pick finger and presser foot mechanisms cooperate with the cord as they move toward and away from the mandrel former;

Fig. 72 shows the manner in which the presser foot rides up on the cam to press the cord against the bead;

Figs. 73 and 74 are views at right angles to each other of the presser foot itself;

Fig. 75 is a side elevational view of the mandrel assembly of the C unit, showing the manner in which the mandrel former is supported and centered for driving purposes.

As will be observed, the mandrel is made up generally of the mandrel core or former 10 and the mandrel walls 11 and 12. The mandrel core or former 10 is annular and of a cross-sectional contour which corresponds to the cross-sectional contour of the tire fabric or carcass which it is desired to form, and the walls 11 and 12 are suitably mounted and maintained in parallel position interiorly of the core or mandrel 10 and symmetrically with reference thereto and with their perimeters 13 and 14 predeterminedly spaced from the lower ends 15 and 16 of the core or mandrel 10, as will be understood upon viewing Figs. 1, 3, 4, 5, 6 and 7 of the drawings. The outer faces of these walls 11 and 12, as shown, are preferably generally what I might term tangential, radial continuations of the curved surface about the core. As the result of this relationship of the mandrel 10 and the walls 11 and 12, an annular space 17 is provided therebetween on opposite faces of the core and below the core, the purposes of which will shortly be pointed out.

The core 10 is preferably made of a material such as steel or aluminum, which not only is generally desirable for this purpose but also has the added characteristics of holding the cords where they are inherently adherent or are purposely made so and if desired the walls 11 and 12 may be made of a similar material.

For the purpose of permitting an anchorage for the cord terminals, the annular walls 11 and 12 are provided for a portion of their external area with a material which either of itself has an adhesive characteristic or has the characteristic of either holding a binder or adhesive or of co-acting with a cord which is so treated, and as one exemplification of this, I have illustrated in the drawings the side walls 11 and 12 each as having imbedded therein an annulus 19 or 20, preferably, although not necessarily, positioned adjacent the perimeters 13 and 14 of these walls 11 and 12 and so dimensioned and associated that they are on the one hand maintained in fixed position and form what is in effect an integral portion of these walls and at the same time present their exterior faces 21 and 22 so that they can be readily reached and contracted with by the cord in the operation of laying and for the purpose that will shortly be pointed out.

Figs. 3 and 4 of the drawing illustrate my method of laying a single or the first layer of cord or cords in the manner and with the apparatus thus far disclosed. Taking the strand B for the purposes of this description as the beginning of the operation, this strand is laid over the core 10 preferably in a position diagonally of and transversly across the mandrel or core 10 as clearly shown in Fig. 3. Where a continuous cord is employed as in the method illustrated, the cord is fed to a predetermined end point and then turned back to form the next cord element C of its layer, the bend forming a loop D.

As already stated, I may form the annuli 19 and 20 of a material which is either naturally adhesive or which will be given this characteristic, or in lieu thereof and preferably, I may form the cord so that it is given an adhesive characteristic by either impregnating it with or incorporating therein or thereupon a binder or adhesive and the application of any pressure to the cord at the point where the cord terminal or loop D is positioned opposite or adjacent to the annulus 23 or 24, as the case may be, or to a portion thereof, will cause an initial adhesion between the two so that the cord will be maintained, temporarily at least, in the position in which it has been laid.

I have illustrated in the drawings a dimensioning of the cord lengths and of the parts so that it is the cord terminal or the loop itself which is associated with the inserted annuli 19 or 20. It will be understood, of course, that the purpose of my invention will be generally effected and attained even though the point of attachment may be slightly inwardly of this extreme terminal or loop end.

It will be observed on viewing Fig. 3 that the sides of the loop D are positioned in substantially parallel relation and side by side in a plane substantially parallel to the surface of the core upon which it is superimposed, so that the cord portions or sections in the same layer cross at no point and that where this operation is repeated for the full circumference of the core with similar loops formed alternately at the opposite side that there is thus provided a cord layer fabric made up at all points of a single thickness of cord.

The laying of this cord layer in the manner described herein and as illustrated in Fig. 3 of the drawing will provide a structure in which the flat loops are positioned on opposite sides of the core or mandrel with the loop itself or a portion adjacent thereto in contact with the strips 19 and 20 and with the cords laid angularly as described across the core or mandrel and with the cords held at their anchorages to the elements 19 and 20 under the predetermined initialed tension under which they are laid.

In order to assist in the maintenance of this initial tension and at the same time to keep each individual cord in the position across the core in which it was laid originally and fixedly relatively to the other cords, I provide circumferentially around the core means whereby the individual cord lengths will be associated with the core at points inwardly of the bead ends thereof in such manner as to tend to maintain them in such position and in the drawings I have shown one method of attaining this result. In Figs. 3 to 7, inclusive, I have illustrated a series of elements incorporated or associated with the core, which, as stated, is preferably made of a material which tends to assist in the adhesion of the cord thereto and which elements serve as points of anchorage for the cord intermediate of the terminal or loop ends thereof. In the drawings these elements are disclosed as a plurality of annuli, three being illustrated in the drawings, namely 27, 28 and 29, in the form of rings of material such as rubber or felt and which should have the characteristic either of being in themselves inherently adhesive or can be made so and in the specific embodiment as illustrated, these rings are received in dovetailed annular grooves positioned circumferentially about the core, one of them being preferably at the apex of the perimeter of the core and the other two preferably at points intermediate the side walls of the core.

It will be understood that when the first layer of cords are laid as stated, not only will the ends of the cord be anchored and the cord positions maintained at the initial tension at which they were laid and in the predetermined position but intermediate points thereof will be similarly held so that the end which it is desired to attain is materially advanced and at the same time the angular position of the cords will also be maintained.

This manner of causing the individual cords to be secured to the core at one or more points intermediate the loop ends thereof is an important factor when the second layer is laid upon the first layer and minimizes any tendency of the laying of the cords of the second layer to displace angularly or otherwise the position of the cords already laid in the first layer.

While I have described the above process of laying cords to form the first layer as employing a continuous cord, it will be understood that as to the broader phases of my invention the various steps set forth may be equally well exemplified with a series of short cords of unitary predetermined lengths or of a length sufficient to extend at least from a point of the annulus 19 around the core to a point at least to or beyond the annulus 20 on the opposite wall.

I will now proceed to describe my method of laying a second layer and the particular features in the apparatus particularly intended and adapted for this purpose.

Upon viewing Figs. 3 to 8 inclusive of the drawing, it will be observed that I have embodied in and associated with each of the walls 11 and 12 a second annulus or ring 23 or 24 which may be, if desired, substantially of the character of that of the rings 19 and 20 already referred to, except that being positioned further inwardly along the walls, they are necessarily smaller in diameter and are positioned inwardly of the annuli 19 and 20 and therefore are further removed from the apex of the perimeter of the core 10. It will be further observed that the outer faces 25 and 26 of the smaller annuli 23 and 24 are positioned in vertical planes which are a greater distance from a plane centrally longitudinally through the mandrel and between the walls than are the corresponding surfaces 21, 22 on the strips 19 and 20 so that in effect a stepped arrangement of these faces of the rings 19, 20, 23, 24 is provided with the step of less height, namely, the face 21 or 22, closer to the apex of the core than is the step of greater height, namely, the face 25 or 26, provided on the smaller rings 23 and 24.

In laying the second layer, the cord sections are laid angularly transversely around the core as are the first cords, except that they are at a substantially reversed angle thereto so that an angle of for instance 90 deg. may be formed between the cords of the one with reference to the other and the terminal or loop ends D of the cord for the second layer are formed at a point either opposite to or beyond that of the annuli 23, 24 and these terminal ends or loops or portions thereof adjacent thereto are adhesively secured to these annuli 23, 24 in any desired or preferred method as by pressure.

It will be understood that by the stepped arrangement described, I am enabled to employ for the laying of the second layer, the same method for anchoring as by adhesion the terminal or loop ends of the cord sections to the walls 11 and 12 as was employed in connection with the first layer, and it will also be understood that all of these factors which assist in maintaining the cords of the first layer in their position of laying and in their condition of inital tension as already set forth will to the same extent assist the cord sections of the second layer for similar functions in my preferred method where I employ a cord which is rendered adhesive in any desired or preferred manner as by impregnating or otherwise.

In Fig. 5, I have illustrated that step of the formation of the carcass in which two layers have been laid on the core in the manner set forth and it will be understood that in connection with the additional steps to be hereinafter described in the formation of the carcass that the illustration of this method thus far described as employing two layers is merely for purpose of exemplification as a greater number or even a less number of layers could be employed by adding to and reducing the number of pairs of annuli that are employed and the number of steps in the stepped arrangement of the faces.

Upon viewing Fig. 5, it will be observed that the carcass thus far formed comprises a series of layers of cord sections superimposed upon each other about the core with their free or loop ends extending beyond the core and initially secured to the walls 11 and 12 at a substantial distance from the inner perimeters 15 and 16 of the core, which perimeters in turn are at a substantial distance from the outer perimeters 13 and 14 of the walls 11 and 12 so that an annular space of substantial width is provided between the walls 11 and 12 and the core 10. The cord sections of the layer or layers already described as laid, extend across this space and the space as will be understood is positioned inwardly of the points of attachment or anchorage of the cord sections, all as and for purposes that will be fully set forth.

In the drawings I have illustrated my method of placing the cords thus far laid under final tension by pressure at the opposite ends of the cord sections and at the same time applying the bead rings thereto.

In Fig. 5, I show in fragmentary section taken diametrically thereof the elements 30 and 31 which are to form the bead rings for the carcass and these rings may take any desired or preferred form and in the drawings are illustrated as of the type specially adapted to form the straight side tire and as will be observed are triangular in cross section. It will also be observed that the space 17, that is, the distance referred to between the inner perimeters 15 and 16 of the core 10 and the outer perimeters 13 and 14 of the walls 11 and 12 is greater than the distance across these bead rings and that the annular space 17 formed as a result of this special relation is both of a diameter and of a distance across as to receive freely the bead rings when moved thereinto.

In my process I preferably position both bead rings opposite the annular spaces 17 referred to and adjacent the cords and then force them inwardly towards each other in a direction transversely of the cords so that these bead rings first contact with the cord sections and upon a continued movement thereof will apply sufficient pressure thereto at a point inwardly of the point of anchorage thereof to release the anchored ends of the cord sections from their adhesive association with the walls 11 and 12 and at the same time cause the cord portions immediately above the point of contact, i. e., nearer the apex of the core, to position itself adjacent the wall 32, 32' of the bead, and in a manner that will be understood, the cord below said point will on a continued inward movement of the beads toward each other tend to fold itself into contact with the surfaces 33 33' of the bead ring so that when the bead rings have been moved simultaneously and at the same time inwardly to their predetermined positions as shown in Fig. 6 of the drawing, the terminal ends or folds will have draped themselves thereabout in a manner as shown in this figure. In this operation there will be a tendency for the bead rings to grip the cord and the inward movement of the bead rings 30, 31 will apply an additional tension simultaneously upon both ends of the cord sections. The gripping action of the bead rings upon the cords will be materially assisted if either the bead ring or the cord is provided with an adhesive surface.

This step will give to the carcass and to the bead ring now associated therewith the general contour and character shown in Fig. 6 and the length of the rear ends of the cords are preferably made such that the overhanging extensions 34, 35 will be provided. These extensions are bent around the bead ring and are caused to be adhesively associated with the remaining uncovered face 36 of the bead ring and may be made long enough to engage about the bead ring and into association with the carcass beyond the bead ring.

While I have illustrated and described these last steps as performed in connection with a continuous cord in which the loops are retained, it will be understood that the steps of said method can be employed where individual cords of predetermined lengths which extend only once across the core are employed or where a continuous cord is employed in the first place and the loop ends then removed either by cutting through the loop or by cutting away the loop.

Upon viewing the figures of the drawing it will be observed that in the apparatus illustrated, I employ a mandrel which comprises a mandrel core 10 and the sections 11 and 12 which are in fact circular walls, the outer faces of which form tangential radial continuation of the curved perimeter of the core 10 and that elements 19, 20, 23, 24, 27, 28 and 29 which are embedded in the mandrel surface so as to present no projection thereabove and that these strips are relatively narrow in construction so that while on the one hand they will serve to initially temporarily secure and hold the cord sections in their laid position they will offer but a slight resistance to the ready and quick removal of the cord sections from the mandrel.

One of the essential purposes of the annuli 27, 28 and 29 is to keep the cord sections from shifting around the core and it will be understood that for this purpose constructions and arrangements other than that herein illustrated might be employed, it being understood that any element or construction or arrangement performing the functions which it is desired to attain and come within the scope of my invention unless otherwise set forth in the claims.

By the process thus far disclosed, I provide for the laying of one or more layers of cords and of the association therewith of the bead rings as and for the purposes set forth. I will now describe the manner in which I lay additional layers and upon viewing Fig. 8 of the drawings, it will be observed that a layer of cord $A^2$ which in the drawings is illustrated as the third layer is now laid over the carcass thus far formed preferably in the manner already described in connection with the first two layers except that the looped terminal ends $D^2$ are bent about the bead and about the terminal ends D of the first two layers as a part of the continuous operation of laying this third layer, by which I mean that as the cord $A^2$ is laid on top of the carcass already formed which, as already stated, has the bead rings 30, 31 associated therewith, the cord $A^2$ is carried around the beads and the cord terminals associated therewith as shown in the drawing with the cord end looped at $D^2$ in the reverse direction so as to give the return bend of this section of the cord.

Upon viewing this figure, it will be observed particularly, that whereas the terminal ends D of the first layers are turned about the bead in a counter-clockwise manner, the third layer and as many layers as are subsequently applied have their terminal ends bent around the assembly in a clockwise manner. The fourth layer $A^3$ and the succeeding layers are preferably laid as is the third layer, except that the terminal ends $D^3$ are progressively lengthened and stepped forward as shown in this figure so as to associate as far as possible all the terminal ends of the layers applied after the bead has become associated with the carcass directly with the cord portions of the carcass already formed. In this manner, I not only obtain a more uniform spread and distribution of the terminal ends of the different layers relatively to the bead, but I at the same time have the terminal ends of the layers so associated with the beads that the beads are more satisfactorily encased by reason of the cords overlapping in opposite directions in addition to which the beads are held centered due to the fact that the cord terminals are anchored thereto from opposite directions. Movement of either bead inwardly or outwardly will be prevented by the terminals of either the inner or the outer layers depending upon the direction in which the application of force is applied to move the bead. It will thus be understood that I have by the method outlined obtained a carcass made up of inner and outer layers with the bead associated therewith in the manner set forth and positioned between such inner and outer layers.

For the purposes of permitting of the laying of the cords in an expeditious manner, I have provided the manner of supporting the mandrel construction thus far described, which is illustrated more in detail in Figs. 1 and 2 of the drawing and upon viewing these figures of the drawings, it will be observed that the mandrel former 10 is provided with an inwardly extending annular flange or rib 40 which extends inwardly from the apex of this mandrel former 10 which flange is provided on its inner periphery with an internal gear 41 and at predetermined points with the recesses 42 one of which is illustrated in Figs. 1 and 2. A sleeve 43 is keyed to a shaft 44 which I will term the mandrel shaft and which shaft may be given a step by step rotation in any preferred or desired manner. The sleeve 43 has extending therefrom the exterior flange 45, this flange being of such a width and its carrying sleeve 43 being so positioned as to position this flange 45 in the same plane as the aforementioned flange 40 so that the two form, in fact, continuations of each other, and I provide an arrangement which I will now describe for locking these two together so that not only will the mandrel former 10 be supported by and from the flange 45 but the mandrel former 10 will rotate as a unit with the shaft 44.

The flange 45 has counter-sunk therein the annulus 46 mounted therein for free rotation relatively thereto, and this annulus 46 has teeth 47 generated upon its outer perimeter arranged to mesh with a small gear 48 rotated by a key 49 which may be in removable association with the gear 48. The annulus 46 is held against removal from its association with the flange 45 by a series of plates 50 which are fixed to the flange 45 and engage the annulus 46, the engagement being illustrated in the drawings as in the form of a cut-out portion 51 into which these plates are counter-sunk in part. The annulus 46 is provided with a series of obliquely positioned slots 52 in each of which engages a pin 53 carried by a plunger 54 so that as the annulus is rotated upon the operation of the key 49, the pins 53 will be given an inward or outward movement dependent upon the direction of rotation of the gear 48 and the plunger 54 will be given a similar movement. Upon viewing Fig. 15 of the drawing, it will be observed that this plunger 54 has at one end a composite structure made partly of teeth sections 55, 56 arranged to engage in between teeth of the annular gear 41 and has in between these teeth sections the projecting pin 57 arranged to engage in the recess 42.

It will therefore be understood that upon the rotation of the annulus 46 in the manner set forth, that the plungers 54 are moved either inwardly or outwardly so as to either engage or disengage with the complimentary parts on the mandrel flange 40 so that the mandrel core is either locked to or released from its association with the flange 45 so that in this manner the mandrel core can be wholly removed from the apparatus now being described.

Keyed to the sleeve 43 are the sleeves 60, 61, the former having the annular flange 62 projecting therefrom and the latter the annual flange 63, these flanges being so positioned that each provides a seat for the walls 11 and 12 already referred to and the annular walls 11 and 12 are fixed in these seats on the flanges 62 and 63 in any preferred or desired manner. Both of the flanges 62 and 63 carry nuts 65 and in the illustrated embodiment four of these are shown as carried by each flange, the nuts being preferably equidistantly and symmetrically spaced about the flanges and having the reduced portions 66 thereof received within cut-away portions in the flanges, the nuts being received within the flanges against rotation with reference thereto in any desired or preferred manner as by screws. These nuts each have threaded openings therethrough and the walls 11 and 12 are each provided with perforations 68 which in number and position are such as to register with the threaded openings through the nut 65.

Right and left screws 71 have their center portions 72 intermediate their ends unthreaded and arranged to be received snugly in openings in the flange 45 which form bearings for the screws, the right handed portion of the screw 71 engaging within the threaded openings of the nuts 65 carried by the flange 62 on the right, and the left handed portion of the screws 71 being received within the similar openings through the nuts carried by the flange 63 on the left, the openings 68 through the walls 11 and 12 being of such a size and character as to freely receive the threaded engagement therewith and the flanges 62 and 63 as well as the sleeves 60, 61 fixed thereto, will be moved in reverse directions so as to cause the walls 11 and 12 to be given a similar movement either toward or away from each other.

For giving these screws (four being illustrated in the drawings) a simultaneous movement, I provide each of the screws 71 at one end with the gear 75, the gears 75 all meshing with the central gear 76 which is fixed to a hand wheel 77. An annular sleeve 78 carried by the sleeve 43 forms bearings for each of the screws 71 as well as for the gears 75 and 76, the gears 76 being in the form of a spur gear. An end plate 79 fixed to the shaft 44 serves as a flange washer for the hand wheel 77.

It will be understood therefore that as the hand wheel 77 is rotated, a simultaneous identical rotation will be given to each of the screws 71 which in turn will move the walls 11 and 12 toward and from each other.

For the purpose of applying the first layers up to and including the point where the beads are associated therewith as shown in Fig. 7 of the drawings, the mandrel walls 11 and 12 are positioned as shown in Fig. 1 in which their outer surfaces form tangential continuations of the surface of the mandrel core 10, all for purposes that have already been set forth. When it is desired to apply the additional layers, the mandrel may be removed altogether from the apparatus in the manner already pointed out or the walls 11 and 12 can be moved inwardly toward each other and against the flange 45 so as to permit of enough space for the application of the remaining layers. In addition I am enabled to use interchangeably different sized mandrel formers 10 for forming different sized tires with the same apparatus merely by replacing the mandrel former 10 and shifting the walls 11 and 12 either further or less apart so as to give these walls their aforementioned association for the purposes of laying the first layers and the bead rings.

The mandrel former 10 which I employ is of a form which permits of the ready removal of the carcass therefrom and in Figs. 9 to 14, inclusive, I illustrate an embodiment of such a mandrel former and an apparatus which I employ in connection therewith.

The mandrel former as stated is an annular ring and is made up of sections, one of the sections, namely 80 being entirely removable and a second section 81 immediately adjacent thereto being pivoted at the point 82 furtherest removed from the removable section. In the drawings I have illustrated a third section 83 immediately adjacent the removable section 80 but on the side opposite to the pivoted section 81 as pivoted at 84, but it will be understood that the use of two such pivoted sections is merely to provide for right and left hand assemblies.

In Fig. 11, I show the manner in which the removable section is locked to and released from the remaining parts of the mandrel former, and as will be observed, this section is provided with undercut grooves 85 on its end faces within which are to be received the gibs 86 carried by the adjacent end faces of the adjacent sections 81 and 83 so that as the section 80 is moved sidewise transversely with reference to the remaining structure and diametrically thereof, with the undercut grooves 85 registering with and receiving therewithin the gibs 86, the section 80 will be moved into position in full registration with the remaining portions of the mandrel former so as to complete its annular structure and will be maintained in position against any radial separation therein. For locking the section 80 to the adjacent sections in exactly their predetermined desired position and for maintaining them in this position, I provide on the opposite end face of the section 80 recesses 87 within which are received lock bolts 88 having their forward positions 89 pressed by the spring 90 into locking engagement in the recesses 91 provided therefor in the gibs 86. When, therefore, the removable section 80 is moved sidewise into position as stated, the locking bolts 88 will be moved into their locking position as soon as the section 80 has reached its predetermined desired position.

For retracting these locking bolts so as to permit of the removal of the section 80 from its association, and for removing this section, I provide an apparatus which I will now describe. A yoke member 95 carries for free rotation therein, the handle member 96 to which is affixed the lever 97 upon the opposite free ends of which are generated the racks 98 which mesh with the gears 99 fixed to the shafts 100 which are arranged to pass freely through the passages 101 provided therefor in the removable section 80. The shafts 100 having at their lower ends the eccentric pins 101' which are arranged to engage in the annular grooves 102 provided in the bolts 88 so that upon a rotation simultaneously of the shafts 100 both bolts will be simultaneously retracted. The shafts 100 are further provided with pins 103 on their sides arranged to register with the grooves 104 formed as extensions of the aforementioned passages 101 which grooves are undercut at their lowermost ends 105 so as to form widened annular grooves so as to permit of the free rotation therein of the pins 103. When, therefore it is desired to remove the section 80, the shafts 100 are inserted in the grooves 101 with the pins 103 registering with the grooves 104 until the shafts are moved to their inwardly furthermost limits, when the eccentric pins 101' will register with the grooves 102 in the bolts 88 and a rotation of the shafts and an operation of the bolts 88 will be permitted. In this manner, furthermore, the apparatus including the elements 95 and 96 are locked to the section 80 so that thereby also a sidewise diametrical movement can be given to section 80 to permit of its removal.

The walls 11 and 12 are so arranged that the parts 19, 20, 23 and 24 are substantially in planes that are tangential to the widest parts of the mandrel which in the embodiment illustrated are adjacent the rings 27, 29 and it will be understood that while I show the walls 11 and 12 as solid and unbroken that the purposes of my invention are equally well effected by any other character of walls which permit of the association therewith of the rings 19, 20, 23 and 24.

It will be further observed that I show the mandrel former 10 as provided both with an internal gear as well as the locking recesses 42. The locking recesses 42 as already explained serve to lock the mandrel to the apparatus herein illustrated and described whereas the internal gear serves as an alternative arrangement whereby either with a similar apparatus or with another apparatus, the internal gear can be engaged and driven by a rotating pinion of any character.

Before proceeding to describe the mechanism whereby a carcass of a cord tire is formed, I will set forth in detail in connection with the diagrammatical showings on Figs. 1 to 16, inclusive, in a general sort of a way the successive steps employed in forming the carcass for a cord tire, which steps generally divide themselves into—(1) the laying of one or more layers of cord; (2) the application of bead rings thereto; (3) the laying of the additional layers of cord to the carcass thus formed to form a complete carcass.

In the various figures of the drawing, I have illustrated in detail the mechanism by which the steps in laying the cords and in attaching the bead hereinabove already set forth in connection with diagrammatical showings in Figs. 1 to 16, are done mechanically and the apparatus generally divided itself into two units of which the first (to which I have applied the term "unit B") first lays one or more layers of cord and then applies the bead to such layers, and the second part of which, which I will term the "unit C" then lays additional layers of cord upon the carcass so preliminarily formed across the mandrel former in a manner already generally set forth in connection with the description given previously.

For the purposes of convenience I will describe the mechanism of these two units under the following general heads: (1) The mechanism for rotating the mandrel former step by step; (2) the mechanism for applying to the mandrel former one or more layers of cord timed with the step by step rotation of the mandrel; (3) the simultaneous application of the beads when the carcass thus far formed is completed; (4) the laying of the additional layers to form the completed carcass.

*The means for giving the mandrel former a step by step rotation.*

Upon viewing Fig. 1 of the drawing, it will be observed that power is applied in any preferred or desired manner to drive the main drive shaft 200 as by tight and loose pulleys 201 and 202 (see Figs. 17 and 18) upon which shaft is carried the gear 203 in mesh with the gear 204 which carries with it the wheel 205 adjacent the periphery of which is carried the pin 206 arranged to cooperate with one of the slots 207 of the star wheel 208, to which is affixed for simultaneous drive the gear 208' in mesh with the gear 209 which is carried by the worm shaft 210, upon which is affixed the worm 211 (see Fig. 19) which worm meshes with a worm gear 212 carried within the housing 215 carried by the mandrel shaft 44.

From the description of this mechanism, it will therefore be understood that as power is applied to the main drive shaft 200 a step by step rotation will be given to the mandrel shaft 44 and to the mandrel former and walls 11 and 12 carried thereby and that the increments of advance given to the mandrel former 10 and its periodicity are predetermined as will be hereinafter more fully set forth so as to coordinate such increment of movement and periodicity with the thickness of the cord to be laid, the size of the mandrel former and the periodicity of the cord laying mechanisms to be more fully hereinafter set forth.

Before proceeding to describe the cord laying mechanism, I will premise that the increments of movement given to the mandrel correspond with increments of rest of the cord laying mechanism and on the other hand periods of rest are given the mandrel during such times as the cord laying mechanisms are operated for purposes of laying the cords.

*Cord laying mechanism of unit B.*

Before proceeding to describe the mechanism for laying the first layers in detail, I will premise that it divides itself naturally into (first) the mechanism and motion for guiding the thread back and forth across the mandrel former; (second) the pick finger mechanism, the function of which is to engage the thread at a predetermined point as the thread is passed along the side of the mandrel former; and (third) the presser foot arrangement, the function of which is to press down upon the thread at a point in advance of the point at which the pick finger has engaged the thread as aforementioned, which point as the pick finger is released then becomes the point of the bending back of the cord and at which the loop is formed.

Upon viewing Figs. 20 and 22 of the drawing, it will be observed that I show here in a general way the mechanism for laying the first layers as above outlined and that the main drive shaft 200 drives through the mitre gears 220 and 221 the counter shaft 222 which drives the shaft 223 through the gears 224 and 225 which in turn control the operation of the mechanical movements above outlined in a manner that I will now point out. Keyed to the shaft 223 is an eccentric plate 225 which has suspended therefrom a roller 226 which is received in the block 227 mounted for sliding movement transversely of the guide way 228 formed in the cross-head 229 from one end of which is carried the rack 230 provided along one of its faces with the teeth 231.

It will be understood that as the eccentric plate 225 is rotated that the cross-head 229 will be given a rectilinear motion which will be permitted by the fact that the block 227 is permitted free transverse movement in the cross-head and the rack 230 mounted in the guide way 228. It will thus be seen that as the rack 230 is reciprocated in the manner described, it will give an oscillation to the shaft 236, mounted in bearing 237, and upon one end of the shaft is carried the thread carrying and feeding mechanism 238 which is oscillated correspondingly to and along with the shaft 236.

The thread carrying mechanism 238 comprises generally the frame work 239 and which is shown more in detail in Figures 25 to 30, inclusive, of the drawing.

Mounted in the frame 239 for sliding movement is the rack 240 having its lower end bent at 240' as shown in Fig. 25 of the drawing and from the lower end of which bent end 240' is carried the slide block 241 upon which is carried the guide dog 242, the surface 243 of which is made to conform to the surface of the cylindrical cams 245 and 245' formed in the frame 246 which cylindrical cams 245 and 245' as will be observed upon studying Figs. 18 and 22 are in the form of grooves formed on the cylindrical surface 246 and reversely inclined as clearly shown in the aforementioned Figs. 18 and 22.

These cam grooves 245 and 245' are, as stated, in their preferred embodiment in the form of two inclined grooves which cross each other intermediate the ends thereof at the point 250, thus forming two grooves which lead into each other as shown, and the purpose of which will now be pointed out.

The dog 242 is supported in the block 241 for angular shifting therein and to permit of this, the block 241 is cut away at its forward end oppositely and radially, so as to permit of a retraction of the spring dog part way within either of said cut away portion, against the action of the spring 250' which tends to force the dog 242 to its outmost position, the cut away portions in the block are shown at 251 and 252. In this manner I am enabled by pulling upon the knob 253 to withdraw the dog 243 from either the cam groove 245 or 245', as the case may be, when the dog is in the cam groove at the point in one of the cam grooves at its point of crossing the other cam groove so as to permit of an angular rotation of the knob 253 and of the corresponding angular shifting of the dog 242 from one cam groove into position in the other cam groove as a result of which the action of the thread layer will be reversed in a manner which I will shortly point out.

It will now be understood that with the dog 242 in position in either the cam groove 245 or 245', as the case may be, that as the assembly 238 is oscillated with the shaft 236 that the rack 240 will be given an up and down movement and the rack teeth 256 will oscillate the pinion 257, and carried upon the same shaft upon which is the pinion 257 is the large gear 258 in mesh with the rack 259 mounted for sliding movement in the support 238 in a position substantially parallel to and spaced from the rack 240 already described. In other words, as the main shaft 200 is rotated continuously the assembly 238 will be oscillated and at the same time the rack 259 will be reciprocated upwardly and downwardly and upon the rack 259 is carried the cord guide 260, the cord being preferably fed from the bobbin 261 (see Fig. 22 of the drawing), through the shaft 236 which is made hollow for this purpose, and through the eyelet 265 in the aforementioned thread guide 260.

By the mechanism described, it will thus be understood that the cord is guided back and forth for a predetermined distance and as will be pointed out more fully, the position of the mechanism already described, and more particularly of the guide 260 is such that the feed of the cord will be across the mandrel from one side thereof to the other and then back again, and as the mandrel is rotated as already suggested step by step synchronism with such feeding, the laying of the threads will be upon successive exposed portions of the mandrel former.

It will be understood from the discussion of the cam grooves 245 and 245' and of the shiftability of the guide dog 242, that when the dog is shifted as described so as to cause it to move from one cam groove into the other, that this will result in a corresponding reversing of the angular movement of the thread layer so as to provide for the desired reversing position of the succeeding layers of cord upon the mandrel former.

In order to permit the variation of the throw of the cord guide so as to provide for varied size tires and for other contingencies, I have purposefully mounted the pinions 257 and 258 upon a single shaft so as to permit of the two forming a single unit, which unit is supported by the arm 270 mounted to center about the pin 271 so as to permit of moving the pinion unit out of contact with both rack bars to the side as shown in dotted lines, and to permit of any change in their ratio thereby to permit of a corresponding change in the length of the vertical throw of the thread guide rack.

The dog 242 as shown causes it to conform to the curvature of the cam grooves 245 and 245' and to permit of its ready insertion into the grooves and free movement therein, it has its ends tapered as shown in 272 and 273. It is furthermore elongated, as shown in Fig. 28 of the drawing so that at no time will the dog move out of the groove except upon a deliberate pull upon the knob 253 as already described.

I will now describe the mechanism whereby the cord is moved back and forth across the mandrel former in the manner as already described and is caused to be associated with and to be held in laid formation across the mandrel former. The gear 280 carried by the eccentric plate 225 which as described rotates with the shaft 223 is caused to rotate with the shaft 223 and in turn rotates the gear 281 and through the idler 282 in turn rotates the gear 283, keyed to the shaft 284 upon which is carried and to which is affixed the double cam to which I apply the reference 285 and which is shown more in detail in Fig. 23 of the drawing. As will be understood upon viewing this Fig. 23 of the drawing, the cam assembly 285 comprises the external cam 286 and the internal cam 287, the operation and purpose of which I will now describe.

A pusher rod 290 has at its lower end the roller 291 coacting with the cam 286 which as shown is of a character to cause a reciprocation of the rod to correspond with the rise and fall of the cam and the rod 290 carries at its upper end the rack 291 which meshes with the pinions 292 which carries the larger pinion 293 inmeshed with the same sized pinion 294 so that as the rack bar 290 is reciprocated upwardly and downwardly, the pinions 293 and 294 will be oscillated angularly and to the same extent and at the same speed and will correspondingly operate the studs 295 and 296 upon which are mounted the levers 297 and 298. Each of these levers is preferably, although not necessarily of the particular shape and contour shown in Figs. 31, 32, 32$^c$ and 33 and has either mounted upon its upper end or has its outer end formed into a passage or chamber to receive the cord which is being laid and pivoted adjacent such end 300 is a latch 301 pivoted at 302 and having its head 303 so arranged that when in its closed position as shown in Figs. 35 and 36, it will form a complete closure within which the cord can be received and held against removal.

This latch is normally maintained in its operative position as shown in Figs. 35 and 36 by a spiral spring 305 mounted upon the stud 302 and is held in its inoperative position against action of the spring 305 by a latch 306 pivoted at 307 and pressed into its locking position by the leaf spring 308 as shown by Fig. 40, the action of the spring 308 causing the point of the latch 306 to engage in the notch 301$^x$ of the latch 301.

As the rack bar 290 is oscillated up and down to correspondingly oscillate the pick finger arms 297 and 298 to bring the pick fingers 301 into contact with the cord, or rather to surround the cord, a lever projection 309 mounted to move with the holding latch 306 is caused to contact with the screw 310 carried by the bracket support so that when the end 300 has been moved into a position so as to partially embrace the cord, the extension lever 309 will strike the screw 310 to withdraw the latch 306 in its holding position to permit the spiral spring 305 to move the latch 301 to its operative position so as to cause the head 303 thereof to close completely about the cord and to hold the cord against being withdrawn backwardly with the needle upon its return movement.

At the same time, the inner cam 287 is operated in somewhat similar manner to cause the rod 315 to be reciprocated upwardly and downwardly and this rod is arranged to similarly oscillate the presser mechanisms 316 and 317 that I will now describe (see Figs. 31, 32, 32$^B$ and 33).

These presser mechanisms 316 and 317 are mounted to oscillate with the studs 318 and 319 which studs have affixed thereto the slotted levers 320 and 321 provided with the slots 322 and 323 arranged to engage about the pins 324 and 325 carried upon such rod 315, it being observed that in order to cause the oscillation of the presser foot mechanisms in opposite directions as desired, that the pin 324 is formed upon a reversely bent part of the rod 315. (See Fig. 32$^A$.)

With the cord held by the pick finger mechanism as already described and the needle part on its return movement to form the adjacent length of cord, the presser foot is moved into position in the direction of the mandrel wall and against the two adjacent lengths of cord forming the bight adjacent a point at which the pick finger is in engagement with the cord and as the presser foot completes its movement into engagement with lengths of cord, as described, the screw 330 mounted thereon for adjustment strikes the heel 331 of the latch 301 to cause that latch to be moved out of its operative position against the pressure of the spiral spring 305 to a position in which the notch 301ˣ is positioned opposite the head of the latch 306 upon which such head is caused to engage with the notch 301ˣ by the leaf spring 308 to again bring the pick finger mechanism back to its original inoperative position which completes the cycle of operation of the mechanism thus far described.

It will be understood that from the operation thus far described, that the cord carrier is caused to reciprocate back and forth along the mandrel former and in a curved path so as to position the cord length back and forth somewhat generally in a position in which it is desired that it should be positioned on the mandrel former and that the pick finger mechanism predetermines in the first place the point at which the cord is to be bent back to form the loop, which loop is finally formed by the action of the presser foot in its operation of pressing the bight of the loop thus temporarily formed into this position.

Mention has already been made of the fact that two reversely positioned cam grooves 245 and 245′ are employed so as to cause the thread layer to operate at one angle across the mandrel former for one layer and at a different angle corresponding to the change in angle of the cam grooves for the next succeeding layer and in order to provide for pick finger mechanisms and for presser foot mechanisms which not only shall operate at opposite sides of the mandrel former and upon the loops formed upon the opposite sides thereof. I have provided two sets of each of the mechanisms on opposite sides of the mandrel walls 11 and 12 each set having its units operate oppositely so that when the cord is being laid across the mandrel former at one angle, one of the pick finger and presser foot mechanism units on one side will operate the cord ends on that side, and similar units at the opposite side will operate similarly the two units so functioning being positioned as shown in the drawing diagonally of each other, the remaining two diagonal units operating at all times, but in the absence of any cord being laid upon which they can function, operate without functioning.

Upon viewing Fig. 23 of the drawing, it will be observed that the cams 286 and 287 are circular in form and each is made up substantially of two similar cams so that two rods 290 positioned 180 deg. apart and two rods 315 also positioned 180 deg. apart will be operated at their proper times so as to permit of the operative association of the thread laying mechanism with the pick finger and presser foot mechanisms, as the thread laying mechanism moves from one side of the mandrel former to the other side thereof.

Upon viewing Figs. 34 to 41 of the drawing, it will be observed that the head of the pick finger lever 297 to which I have applied the reference character 300 is in the form of a box like structure having a slot 330 in which the latch 301 is received for pivotal movement and the loop extension 331′ is provided with a depression or slot 332 in which is received the end of the head 303 of the latch 301 so as to prevent the tension of the cord forcing the latch 301 to its open position.

I further provide this end 300 with the extensions 333 positioned above the extension 331′ and which extensions 333 serve as strippers to prevent the cord moving backwardly with the head 303 of the latch 301.

It will be observed that the presser foot mechanism as well as the pick finger mechanism are supported about the studs 295, 296, 318 and 319 for rotation therewith in such a manner that the angular position with reference to the studs may be varied when desired so as to provide for any changes or variations incident to a change in the size of the carcass being formed and where, for any other reasons, adjustments may be necessary or advisable.

Upon viewing Figs. 17 and 20 of the drawing, it will be observed that the mechanism thus far described for laying the thread has included the pick finger mechanism and the presser foot mechanism, are all mounted and carried upon the platform or table 340 which is mounted upon the frame of the machine for movement to the left in Figs. 20 and 21 for which reason it will be observed the space 341 is provided. This movement to the table 340 may be given by means of the racks 342 and carried at the lower end of the table with which mesh the gears 344 and 345 carried upon the shaft 346 which can be rotated by the handle 347, which shaft 346 is mounted in the bearings 348 and 349 which are mounted on the fixed frame of the machine. In this movement back and forth the table 340 is guided in the guideways 350 and 351 of the frame. In this manner, the mechanism thus far described can be moved out of position adjacent to the mandrel former so as to permit either of the removal of the mandrel former or to make room for the bead laying operation which will hereafter be described.

The cord laying mechanism is carried upon the table 340 as is also the pick finger mechanism and the presser foot mechanism both of which are carried from the brackets 353 supported on the table 340. Before proceeding to describe the bead laying mechanism, I will state in this connection that this bead laying mechanism, is similarly carried upon the platform 260 which is mounted, as is the table 340 for a movement into and out of position adjacent the mandrel for operative association therewith, and that the movement of this bead laying mechanism into operative association with the mandrel will contact with the platform 340 in case that platform has not been moved out of the way in the manner as set forth above to cause that platform to move out of the way so as to make way for the bead laying mechanism, as this platform 340 is moved out of the way it carries with it the gear 221, and in order to avoid the difficulty incident to remeshing the gears 220 and 221 if the gear 221 were moved out of contact with the gear 220, I mount the gear 220 for sliding movement on the shaft 200 and provide the teeth engagement 360 between the sleeve 361 carried by the gear 220 and the sleeve 362 carried by the driving shaft 200 and attached to the platform 340 is the arm 364 engaging in the groove 365 in the sleeve 361 so as to cause the gear wheel 220 to move with the platform and to break the driving connection with the shaft 200. In order to provide for the meshing of the drives in their proper association, it will be observed that I have used a clutch connection comprising a single tooth so that the two can be re-engaged in only the one predetermined position.

In order to provide on the one hand for throwing out step by step motion to be given to the mandrel and to keep the mandrel stationary and also to provide for a continuous drive for the mandrel, I show in Fig. 19 a double clutch in the form of a sleeve 701 having clutch teeth 702 at opposite ends arranged so as to have the first teeth engage with the teeth 703 fixed upon the step by step drive already described so that when these teeth are in engagement, the desired step by step increment of motion will be given to the mandrel and when the clutch sleeve is moved to its other extreme position so as to cause the teeth 702 to engage with the teeth 704 on the sleeve 704' upon which is mounted the gear 705 driven by the motor 706, a continuous drive will be given to the mandrel and with the clutch sleeve 701 in the position shown in the drawings, no drive of any character will be given to the mandrel.

*The bead applying mechanism.*

As has already been stated, the bead applying mechanism which is shown at the right in Figs. 17 and 18 is so mounted and arranged as to be moved into operative position with relationship to the mandrel when the carcass formed on the mandrel is in a condition where the beads can be applied, and in Figs. 42 to 54 I show in detail this mechanism which I will now describe.

Upon viewing Figs. 42 and 54, it will be observed that the bead applying mechanism comprises generally the rings 400 and 401 carried for movement toward and from each other from the frame members 402 and 403 in a manner in which I will now describe. The rings 400 and 401 are carried by the pins 404 which are mounted for free sliding movement through the supports 402 and 403 and which carry at their opposite ends the web plates. The web plates 405 and 406 are arranged to slide axially on the collars 407 and 408 (see Fig. 52) carried by the bracket supports 402 and 403. As many of these pins 404 may be employed as desired, and upon a sliding movement of the web plates 405 and 406 a similar sliding movement in the same direction will be given to the rings 400 and 401 carried thereby.

Upon viewing Figs. 42 and 43, it will be observed that I employ the yokes 410 and 411, each of which has its opposite arms in engagement with the collars as at 412 (see Fig. 52) and that these yokes 410 and 411 are mounted for pivotal movement about the shafts 413 and 414. Extending in the opposite direction and carried by the yokes are the extensions 415 and 416 arranged to coact with the worm sections 417 and 418 carried upon the shaft 419 and rotated by the hand wheel 420 so that as the shaft 419 is rotated, the extensions 415 and 416 will be given an angular movement about the shafts 413 and 414 in opposite directions so as to cause the yokes 410 and 411 also to move in opposite directions so as to move the rings 400 and 401 either toward or away from each other simultaneously.

The rings are preferably shouldered externally as shown in 420 so as to receive thereon in the nested position the bead rings F, and the rings 400 and 401 are further provided with the shoulder 421 positioned opposite to the shoulder 420 for purposes that will shortly appear.

Before moving the bead laying unit into position adjacent the mandrel for cooperation therewith from its position as shown in Figs. 17 and 18 of the drawing, and before the mandrel core itself is placed in position, I pass over the mandrel walls 11 and 12, already described, a bead ring and hang it upon hook 215' to be ready for association with carcass at the proper time, and on the opposite side of the mandrel walls from that on which hook 215' is located, I place a second bead ring in position over hand wheel 77 and its attendant mechanisms, and in order to permit of moving the bead forming mechanisms generally referred to, into position adjacent to the mandrel former mechanism without interfering with the mandrel drive positioned generally centrally thereof, I make the bead forming mechanisms generally U-shaped as shown in Fig. 43 of the drawing, and I make the rings 400 and 401 already referred to sectionally as shown in detail in Fig. 53 of the drawing to which reference will now be made more in detail.

These bead carrying rings are provided with the section 421 pivoted thereto at 422 and arranged to be locked thereto as by a screw 423 and when the bead laying mechanism is in inoperative position on the extreme right, the section 421 is in open position and pendant (see dotted lines in Fig. 43), and when the bead forming mechanism is moved into position by operation of the hand wheel 424, the operating gears 425 mesh with racks 426 carried by the table 427 and the table 427 along with the mechanism carried thereby will be moved into position so as to permit of the rings 400 being positioned concentrically with the mandrel support and when so positioned, the pendant section 421 may then be moved to closed position as shown in Fig. 53 of the drawing so as to complete the bead forming ring structure. The bead rings positioned on opposite sides of the mandrel structure, as already referred to, are then placed on the shoulders of the bead ring carriers 400 and 401 as shown in dotted lines on Fig. 52 of the drawing, and upon the operation of the hand wheel 420 in the manner already described, the bead ring carriers 400 and 401 will be moved toward each other, so as to force the bead rings F into the annular space 17 provided between the lower ends 15 and 16 of the mandrel former and the upper ends of the walls 11 and 12 as more fully set forth and described in connection with Figs. 4 and 5 of the drawings hereinabove, the bead rings being forced to a predetermined position and causing the layer cords already laid about the mandrel core to be associated therewith in a manner as shown in Fig. 50 of the drawing in connection with one layer and in Figs. 5 and 6 in connection with two layers.

Upon viewing Figs. 45 to 47, it will be observed that the size of the rings 400 and 401 is preferably such with reference to the diameter of the walls 11 and 12 as to cause the rings 400 and 401 to substantially nest upon the perimeters of the walls 11 and 12, when the bead rings are moved to their extreme predetermined position for their association with the layer of cords already laid, and for the purpose of preventing the return of the bead rings with the bead ring carriers when these carriers are moved and pass out and away from each other, I have provided a mechanism which I have illustrated more fully in Figs. 45, 46 and 47 and which I will now describe.

Carried by the rings 400 and 401 are the pins 430 passing through the openings in the supports 402, 403, springs 431 being positioned between the shoulder 432 on these pins 430 and the bead ring carriers 400 and 401. These pins 430 are reduced at their ends 433, which reduced ends pass through the rings 400, the outermost end of the pins being provided with the enlarged head 434 which will prevent a movement of the pin through the bead ring carriers in one direction, but which will permit a movement of these pins therethrough in the opposite direction. Upon the frame 402 and positioned in registry with the position of the pins 431 are the latch dogs 435 provided at their outer end with the head 436 having an inclined portion 437 and provided intermediate the ends thereof with the head 438, the functions of which I will now set forth.

When the bead ring carriers 400 and 401 are moved toward each other from their position shown in Fig. 52, the pins 430 will necessarily be carried along with them due to the headed part 434 and during its forward movement the lug 438 of the latch dog 435 will rest upon the perimeter of the member 430 until the bead ring carriers and the pin reach a position where the butt ends 439 of the pins 430 permit the spring 440 to pull the latch 435 down so as to bring the heel of the projection 438 in back of the butt end 439 of the pins so as to lock these pins against return movement with the bead ring carriers 400 and 401 and upon a reverse movement of the hand wheel 420, the bead ring carriers will be moved away from each other, but the pins 430 will be held against such movement during the first part thereof so that the pin will be forced to move through the ring so that the pin will be held against backward movement and will hold the bead rings F in the position to which they have been moved originally and prevent their return with the bead ring holders 400 and 401.

Upon a continuation of this return movement of the bead ring carriers away from each other, the web plates 412 and 413 contact with the inclined portions 437 of the free ends 436 of the latches 435 so as to raise these latches, along with which are the heel portions 438 so as to permit the springs which have been contracted as shown in Fig. 47, due to the relative movement therebetween of the bead ring carriers, to again expand and restore these pins to the normal relative position to the bead ring carriers and the rest of the moving mechanism.

With the bead rings in position, the cord ends or the loop ends will be positioned about the beads as illustrated in Fig. 50, and I will now describe the mechanism whereby these ends are completely turned about the bead in the manner shown in Fig. 51. Carried upon the frame of the bead layers are the bracket supports 450 upon which is mounted the gear 451 meshing with the gear 452 on one side and with the gear segment 453 on the other side, the gear 452 having fixed thereon the lever 453 which carries on its outer end the member 454. A second lever 456 is also pivoted to the bracket 450 as at 457. This second lever also has attached to it the member or plate 454.

It will therefore be obvious that when the gear segment 453 is rotated in one or the other direction, it will cause the bracket to move either toward or away from the bracket support 450 and the spring 460 normally tends to hold the brackets 450 and 454 in closely nested position. Upon the upper end of the bracket 454 is carried the shoe 461 which as shown in Figs. 53 and 54 of the drawing is reversely bent so as to press down the cord ends which are passed into contact with the reversely bent surface thereof. At the opposite side of the mechanism is a similar construction to which the same reference characters have been applied. Carried by the gear 453 is the roller 464 which is arranged to coact with the shoulder 421 on the bead ring carriers 400 already hereinbefore referred to, so that as the bead ring carriers are withdrawn to their full inoperative position as already described, the shoulder 421 will contact with the roller 464 to move the bracket 454 to its extended position as shown in Fig. 52 of the drawing, so as to bring the shoe 461 in operative position with reference to the cord ends.

It will be observed that the movement of this shoe will be an upward one, so that its first operation will be to lay the cord ends beyond the bead ring down upon the bead ring and upon a rotation of the mechanism with these shoes thereon in a manner shortly to be described with reference to the mandrel and the cords thereon, all the cord ends will be similarly turned about the bead ring.

The brackets 450 are carried by the annulus 465 to which is attached the spur gears 466 which spur gears are rotated reversely by the hand wheel 467 which rotates the gear 468 in mesh with the gears 469 and 470 which drive the sprocket chains 471 and 472 by the sprockets 469' and 470' (see Figs. 42 and 43), which in turn drive the sprockets 473 and 474, the chains passing over the idlers 475. The circular rack 466 (see Fig. 53) is an incomplete annulus which is broken away in the U-shape in conformity with the U-shape of the whole bead unit for purposes already set forth and in order to prevent any possibility of this circular rack going out of mesh, I have employed two pinions spaced apart a greater distance than the broken away portion of the sprocket 466. It will therefore be understood that as the hand wheel 467 is rotated the annuli 465 will be rotated in reversed directions so as to give similar reverse movements to the paddles 461 as a result of which the cord ends extending beyond the bead on both sides of the mandrel will be turned down angularly upon the bead in opposite directions.

It is a matter of great importance that the bead laying mechanism occupy its desired predetermined angular position before it is moved into operative association with the mandrel and this position, as will be understood from the description of the mechanism, and as already stated is that in which the opening in the mechanism which is substantially U-shaped and which will be understood as Fig. 43 is observed shall present itself in a position horizontally of the axis of rotation of the mandrel. In addition, it is essential that the apparatus illustrated in Fig. 52 for laying down the cord ends shall be held against movement until this desired predetermined association of the bead laying mechanism with the mandrel is had and for this and for other purposes, I have devised a safety mechanism, shown in Figs. 43, 49, 49$^A$ and 52 and in which the collar 676 (see Fig. 49$^A$) is affixed over one end of the shaft 414 from which collar depends the spaced fingers 677 and 678 depending from the flange 679 carried by the collar 676, thus presenting an opening or space 680 between the fingers 677 and 678. Mounted upon the shaft 681 upon which is carried the sprocket wheel 470', already described, is a small gear meshing with the gear 683 mounted upon a shaft to which is affixed the disc 684 which is provided with a slot 685 on its periphery (see Fig. 49). It will therefore be understood that when the hand wheel 420 is rotated to move the levers 410 and 411 about their pivot 413 and 414 so as to move the bead laying mechanisms toward each other, the collar 676 and the fingers carried thereby will be moved angularly with the shaft.

Upon viewing Fig. 49 of the drawing with the fingers 677—678 straddling the disc 684, rotation of the shaft 414 by the hand wheel 420 will be prevented unless the fingers referred to are in a line in registry with the opening 685 in the disc 684. Assuming that such registry is had and the shaft 414 permitted to rotate, it is obvious that the rotation of the disc 684 will be permitted only when the movement of the shaft 414 and with it of the fingers 677—678 is such as to cause the space 680 between the fingers to register with the disc 684, as otherwise one or the other of the fingers will be presented in the path of the disc. In other words, while on the one hand, no movement of the hand wheel 420 and of the mechanism controlled thereby is permitted unless the disc occupies a definite predetermined angular position, on the other hand, no movement of the disc and therefore of the hand wheel 467, and consequently of the annuli 465, 466 will be permitted unless the shaft 414 and the fingers 677 and 678 are moved to a predetermined limit since the disc 684 is geared to rotate with the mechanism which drives through the sprocket chains 472 and 471. It will therefore be understood that bead laying mechanism on each side can be operated only when the driving mechanism is in a predetermined angular position and consequently only when the bead laying mechanism presents its U-shape opening in its desired position relatively to the mandrel support and mandrel, and on the other hand, that no movement can be given to this mechanism unless the bead laying mechanism has been properly positioned.

The safety mechanism above described functions to prevent the movement of either hand wheels 420 or 467 unless the other hand wheel and the mechanism controlled thereby is in its proper position for operation. In addition to this I have illustrated in Figs. 43, 49 and 52 the additional safety mechanism for preventing the movement of the bead laying mechanism as a unit into or out of its association with the mandrel until and unless the annuli 465 and 466 are in their proper angular position. This additional safety mechanism comprises a plate 690 carried by and to the side of the gear 683 which as already stated rotates with the disc 684 and which disc 690 has a notch 691 positioned therein and arranged to receive the angular head 692 formed on top of the plunger 693 in the bracket 673' which plunger 693 is normally moved upwardly by the spring 694. It will be observed that this upward movement of the plunger 693 into the notch 691 will be possible only when the notch is in registry therewith.

Upon the gib 351 is fixed a bar 695 which is of a length substantially that of the movement necessary to be given to the bead laying mechanism in moving it to and from its extreme inoperative and operative position for reasons that will be understood. The height of this bar 695 and the length of the plunger and its position in the bracket and the dimensions generally of the parts are such that if the head 692 of the plunger is not permitted to enter the notch 691 because of the angular position of the discs 684 and 690 then the lower end of the plunger 693 will be below the top of the bar 695 and immediately to one side thereof so that no movement of the bead laying mechanism as a unit is possible. On the other hand should the notch 691 register with the plunger 693 so as to receive the head 692 thereof as shown in Fig. 49 then such movement of the bead laying mechanism in the operative position will be permitted and this movement will carry the plunger 693 beyond the opposite end of the bar 695. When therefore the bead laying mechanism is moved into the operative position and the parts thereof are made to function by the hand wheels 420 and 467 as described the disc 690 will be rotated counterclockwise as shown by the arrow in Fig. 49 which, due to the angular face on the notch 691 and the angular face on the plunger head 692, the plunger will be automatically moved downwardly which movement of the plunger will be permitted because of the fact that the bar is of such length that the plunger will be beyond this bar when the bead laying mechanism is in its operative position. With the completion of the bead laying operations, it will not be possible to move such mechanism away from the mandrel and into inoperative position unless the notch 691 is again in registry with the plunger 693 as otherwise the plunger will be in its depressed position and will be stopped by its engagement with the end wall of the bar 695.

*Unit C.*

The carcass thus formed and including as is does one or more layers of cord with which have been associated bead rings around which have been wrapped the cord terminals is now removed along with the mandrel former 10 from the apparatus thus far described, which removal is permitted by the mechanism shown more fully in Figs. 1, 2, 17 and 18 of the drawing, the mechanism which I will now term the cord laying mechanism, shown more fully in the remaining figures of the drawing.

Upon viewing Figs. 55, 56, 57 and 59 of the drawings, it will be observed that this unit C comprises a support 500 upon which is mounted a driving shaft 501 which is given a step by step increment of movement by means of the worm and worm gear rotated by the Geneva 502 driven by the roller 504 mounted upon the stud 503 carried by the gear 505 driven from the gear 506 mounted upon the shaft 507 to which power is applied in any preferred or desired manner, as by the tight and loose pulleys 508 and 509. The shaft 501 in turn drives the shaft 510 upon which is mounted the gear 511 meshing with the gear 512 with which is rotated the gear 513 arranged as shown in Fig. 59 arranged to mesh with the internal gear 41 generated on the inside of the mandrel former 10 as clearly shown in these figures as well as Figs. 2, 9, 10 and 11 of the drawings.

For purposes of maintaining the mandrel in proper mesh with this gear 513, I have employed a support 514 (see Fig. 59) which is provided with the radially positioned slideways 515 within which are received the slide blocks 516 upon the outer ends of which are carried the gears 517. The number of gears 517 that may be employed may be as desired or needed, and as will be observed upon viewing Figs. 59 and 75 of the drawings, each of the slide blocks 516 is provided with a stud 520 passing there through and provided with heads 521 and a plate 522 is mounted for rotation upon the stud 522' carried on the bracket 514 which plate is provided with the arcuate shaped slots 523 preferably of the character shown in the drawings and wide enough to receive the body of the stud. It will therefore be understood that any rotation of the plate 522 by means of its handle 524 will cause the cam shaped portions of the grooves 523 to operate upon the studs 520 to either pull or push upon the slide blocks 516, and to correspondingly act upon the gears 517. As the axis of rotation of the plate 522 is the same as the axis of rotation for the mandrel former 10, the construction described will operate not only to support the mandrel former from a plurality of points, but will also cause the mandrel former to be centered with reference to its desired axis of rotation so as to permit of the correct engagement of the teeth of the pinion 513.

I employ in connection with this unit C what I will term the thread laying mechanisms, and to which I have applied generally the reference character 530 in Fig. 56 and the pick finger mechanisms to which I have applied the reference character 531 in said figure.

An oscillating movement is given to the thread laying mechanism 530 from the drive shaft 507 through the gearing 538 and 539 in any desired or preferred manner as by the mechanism already described in connection with Figs. 17, 18, 22 and 24 and as this bracket 530 is oscillated as described, it gives a reciprocating up and down motion to the rod 545 preferably by the same mechanism as already described in connection with unit B. (See Figs. 17, 18, 22 and 24.)

The thread G is carried up through a hollow shaft as in unit B and through the eyelet 546 then through the thread guide 547 also as shown in connection with the unit B and therefore as the bracket is oscillated back and forth as already described, the thread guide 547 will be given similar oscillations from one side of the mandrel former 10 to the other side of the mandrel former 10 and also an up and down reciprocation so as to cause the cord to be positioned angularly across the mandrel in one direction or another.

The rod 545 upon which is carried the thread guide 547 is given its reciprocating up and down motion angularly across the mandrel in either one direction or the other by means of cam grooves 548 and 549 in which is engaged the shoe 550, all substantially in the manner as already described in connection with the similar rod 259 already described in connection with Fig. 25 of the drawings.

I will now describe the mechanism by which the cord is carried around the mandrel angularly thereacross. The mechanism 530–547, inclusive, is caused to be associated with the cords already laid as an additional superposed layer with the ends thereof drawn about the bead and about the cord terminals already associated therewith.

Upon viewing Fig. 57 of the drawing, it will be observed that I here show the cup-like member 560 to which are attached the outside sleeve 561 having its upper surface in the form of a double cam 562 and the inside sleeve member 563 having upon its upper surface the double cam 564, and positioned oppositely each other and preferably 180 deg. apart are the pairs of rods 566—567 and 568—569, the pair 566—567 carrying at their lower ends the rollers 572 which gravitate upon the sleeve 563 and the pair of rods 568—569 have similar rollers 573 which gravitate upon the cam surfaces 562 of the sleeve 561 so that as the cup-like member 560 is rotated continuously, the cams 562 will cause one of the rods to move upwardly and at the same time permit the other rod to gravitate downwardly and the cams 564 will have a similar action with reference to the two rods which cooperate with it. As will be observed upon viewing this Figure 57, these pairs of rods are positioned so as to have one of them on each side of the mandrel so that the rods 566 and 569 are on one side of the mandrel and the rods 567 and 568 on the other side thereof and the mechanisms carried at the upper ends of these rods and now to be described are similarly positioned.

The rods 566, 567, 568 and 569 are each provided, respectively, on their upper ends with racks 570, 571, 572 and 573.

The racks 570 and 571 on top of the rods 566, 567 (see Figures 57 and 58) mesh with the pinions 574, 575, the pinions 576 and 577 being fixed to rotate respectively with the pinions 574 and 575 and these pinions 576, 577 each in turn mesh with a similar sized pinion, the one meshing with the pinion 578 and the other meshing with the pinion 579. Fixed to rotate with the pinions 576 and 578 are the lever arms 580, 581, and fixed to rotate with the pinions 577 and 579 are the lever arms 582, 583. It will, therefore, be understood that as the racks 566 and 567 are reciprocated one upwardly and downwardly, the lever arms 580 and 581 are swung about their axes of rotation toward and away from each other while the lever arms 582 and 583 are also swung toward and away from each other, it being understood that the movements of the two sets of lever arms follow each other; the movements of the lever arms on the opposite sides of the mandrel being so synchronized as to cause them to coordinate with the movements of the cord laying mechanism as the cord is moved into contact with the bead on the one side and then thereafter on the other side of the mandrel former.

It will be observed that due to the construction of the cam 562 which is substantially of the same character as the cam 286 in Fig. 25, the rods 566 and 567 will follow each other in their rise and fall as the cam rotates, and that therefore while the gear 574 is being oscillated in one direction, the gear 575 is being oscillated in the other direction so that therefore the arms 580 and 581 on the one side will be moving toward or from each other as the case may be, while on the other side the arms 582 and 583 will also be moving toward or from each other, but in a direction reverse of that of the first mentioned pair of lever arms.

In Figs. 65, 66 and 67, 67^A and 67^B I show one position of these various lever arms 580, 581, 582 and 583, and I will now describe their construction and operation in detail.

Upon viewing Fig. 67^A it will be observed that each of the lever arms is bent as shown, and at their free ends the levers are provided with slotted guide bracket 600, within which moves a slide 601 having a pin 602 thereon in lost motion engagement with the slot 603 on the bellcrank lever 604, pivoted at 605 and having upon its outer free end the roller 606. Mounted upon the outer end of the slide upon the pin 607 are the levers 608 and 609, the lever 609 having pivoted upon one of its outer ends by means of the pin 610, the cord lock 611 which slides through the slide head 612' affixed to the aforementioned member 601. This cord lock 611 is angled at its front end as shown at 612 and has projecting from such end the pin 613. The slide 601 has at its outer end the upwardly projecting stripper flange 614, provided with a perforation 616 so positioned as to cause the pin 613 to register therewith and to be received therein, and in the cord receiving chamber 614 formed therebetween, upon a proper relative movement between the slide 601 and the cord lock slide 611.

The bellcrank lever 604 is normally maintained by the spring 617 (see Fig. 67) in the position shown in Fig. 68 with the slide 601 in its extreme position to the right as shown in that figure, in which position the head 620 of the latch lever 608 is held so as to engage over the adjacent end 621 of the cord lock 611 so as to hold the pin 613 in its outer inoperative position as shown in Fig. 68.

Upon viewing Fig. 67, it will be observed that I employ the spring 622 and 623, one of which engages the aforementioned latch lever 608 to hold it in its operative position as shown in Fig. 68, and the other of which engages the part 612 of the cord lock 611 to pull upon the part 612 and to move the pin 613 into its operative position shortly to be described.

Upon viewing Fig. 58 of the drawing, it will be observed that the bracket 630 through which are mounted the shafts 631 and 632 which carry the gears 574, 575, 576 and 577 is split in two and each section is made cylindrical in part and mounted for rotation upon each cylindrical section between the shoulder 633 and 634 and the lock nuts 635 and 636 are the rotating sleeves 637 and 638 and in which are cut the gears 639 and 640 with which mesh the racks 568 and 569 already referred to, so as these racks are given an up and down movement by the cams 561, as already described, the sleeves 637 and 638 will be oscillated, and in such oscillation will oscillate with them the cam rings 642 and 643, a section of one of which is shown in Fig. 71, and a side elevation in Fig. 75.

As the lever arms 580, 581, 582 and 583 are oscillated toward and from each other in pairs as already described, an oscillation is also given to the cams 642 and 643, and at a predetermined point in the already described movement of the cord laying mechanism across the mandrel former 10 and in the movement of the aforementioned lever arms the roller 606 on the bellcrank 604 (see Fig. 71) is so positioned as to be contacted by the highest part of the rotating cam 642, upon which the bellcrank lever is moved counterclockwise to move the slide 601 to the lefthand side of Fig. 71, and in said movement it carries with it the lever 609 and its pivot 610 and the cord lock 611 against the action of the springs as described, so as to cause the part 612 with its pin 613 to be positioned in the inoperative position as shown in Fig. 71, and to permit the latch lever 608 to position its head 620 in operative locking position as shown in said Fig. 71. With the parts positioned as shown in Fig. 71, the pick finger mechanism is in its inoperative position with the pin substantially out of the guideway 614' formed between said slide head 612' and the slide flange stripper 614.

The description thus far given is of the mechanism in its inoperative position. As the cord laying mechanism moves the cord across the mandrel former, the pick finger mechanism of which there are four, is each being given its oscillation, and as the cord reaches a position on one side of the mandrel former adjacent the bead ring, one of the pick finger mechanisms carried upon the lever arms is also being oscillated into position for cooperation upon and functioning with the cord (one of the pick finger mechanisms on the same side not functioning, depending upon the angle at which the cords are laid across the mandrel former, for the same reasons as have already been set forth in connection with the pick finger mechanisms in unit B); at a predetermined point the cord is laid by the cord laying mechanism in the cord receiving chamber 614' formed between the slide head 612' and the stripper flange 614, and as the needle continues its movement in the same direction and before it starts its return movement, the heel 646 of the lever 608 is moved by the bracket cam 647 (see Fig. 71) about its pivot 607 so as to move the head 620 away from the adjacent head 621 of the member 611 upon which the springs will function as follows:—The spring 622 will pull the head 612, of the cord lock 611 to the right so as to cause the pin 613 to pass through the hole 616 in the flange 614 and to position the pin 613 immediately above the cord laid in the chamber 614 so as to form a complete closure about the cord. When, therefore, the cord laying needle has reached its limit of movement and starts to return, the cord will be caught in the aforementioned chamber formed between the elements 612' and 614 beneath the pin 613 and a loop or bight will be formed therein; it being understood, of course, that when this occurs, the corresponding pick finger mechanism has oscillated to a position immediately adjacent one of the bead rings which has already been laid as described previously.

Substantially at the point where this movement of the pick mechanism has been completed, the cam 642 will have oscillated to a position where it comes in contact with the roller 606 and moves the bell crank lever counterwise, carrying with it the slide 601 which in turn carries with it the pivot 607 upon which are mounted the levers 608 and 609, as well as the slide head 612'. In this movement of lever 609 the cord lock member 611 will be moved by it in the same direction and substantially to the same extent as the slide 601 and substantially parallel to it being guided in such movement by the slide head 612'. At a predetermined point in the movement of the slide 601 carrying with it the lever 609, the heel 619 of the lever 609 is brought into contact with one end of the abutment screw 629 mounted in the lever arm 582 for adjustment therein and as a result of the continued movement of the slide 601 on the one hand, and the engagement of the heel 619 of the lever 609 with screw 629, the lever 609 is given a movement about its pivot 607, as a result of which the cord lock member 611 is given an added movement in the same direction, so as to cause its part 612 to be given a movement relatively to the part 612' and the stripper flange 614 carried by the slide 601, so as to cause the withdrawal of the pin 613 from its position above the cord in the chamber 614', thus permitting of the release of the cord from the chamber 614'.

Just about the time that the pick finger mechanism and more particularly the pin 613 is moved to its inoperative position to release the loop, as just described, which loop results in the first place from the movement by the pick finger mechanism of the cord out of its normal path as laid by the needle (see Fig. 61) and which loop is completed by the return transverse of the needle 532 to the opposite side of the mandrel, the loop will be engaged by the pressed foot mechanism, now to be described, and forced thereby into engagement with the inside angular face of the bead, as shown in Fig. 62, on the right, it being understood that before this operation of the presser foot mechanism takes place the needle 532 has completed its return transverse to the opposite side of the mandrel, as shown in Figure 63, and the cord on that opposite side has been engaged by the pick finger mechanism on that side which functions just as does the pick finger mechanism already described and that the final operation of pressing the loop on one side into contact with the bead is, as a matter of fact, effected when the needle 532 has again started and has completed in the greater part its movement back to its position for cooperation with the pick finger mechanism on the left of Figure 62.

Attached to one side of that portion of the lever arms 580, 581, 582 and 583 upon which the pick finger mechanism is carried, is the mechanism shown in Figs. 72, 73, 74, 67$^A$ and 67$^B$ and which I will term a presser foot mechanism. This presser foot comprises a pin 650 having projecting from its opposite ends and in opposite directions the lever arms 651 and 652, the arm 651 having mounted at its free end the roller 653 and the arm 652 being formed at its free end with an extended flat surface somewhat in the form of a foot or paddle and to which the reference character 654 has been applied. This pin 650 is pivoted upon the part 657 of the slide head 612' with the paddle portion 654 projecting in one direction and the roller 653 presented to the cam 659 formed upon one face of the slide 601 so that on the relative movement of the cord lock 611, incident to the engagement of the lever 609 with the screw abutment 629 as already described, the relative movement of the cam 659 will cause the roller 653 to move that end upward and cause a corresponding downward movement of the lever 652 to bring the paddle surface 654 down upon the bight of the cord just about the time when the pin 613 is being moved to inoperative position to release the cord. In other words, just prior to the release of the loop of the cord by the pin 613 the paddle portion 654 of the lever 651 is brought down upon the loop, which as already stated, is closely adjacent to the bead to cause the loop to be pressed down upon the cord layers already formed about the bead rings.

In Figs. 60 to 64 inclusive, I show the successive steps of the functioning of the pick finger mechanisms and the presser foot mechanisms. As will be observed, there is shown on the left of these figures, the successive movements of parts of the mechanisms functioning on one side of the mandrel former to wrap the cord about that one of the bead rings, and on the right of each figure is shown the movements and operations of that mechanism which functions on that side for associating the cord ends with the bead ring on that side.

In Fig. 60, the lever arm mechanism 580 is shown just at the time when the cord is being locked in the chamber formed between the elements 612′ and 614, and beneath the pin 613, and as this lever arm 580 is given its oscillation due to the rotation of the gears 576 and 577 to one of which it is fixed, the cord is carried about the bead to the position shown on the left in Fig. 61, and as the cord laying mechanism starts its return movement, the loop is definitely formed at a predetermined point in its movement. As this lever 580 continues its movement, it reaches its position shown on the left in Fig. 61, at which point, due to the timing of the motions and the character of the controlling cams, the hold upon the cord by the parts 612, 613 and 614 is released, but before the release is fully effected, the presser foot 654 is caused to engage with the bight of the loop and caused to press it down upon the innermost angular face of the bead and into adhesive contact with the layers already laid, which action is illustrated clearly on the right in Fig. 62 in connection with the pick finger and presser foot mechanisms carried by the lever 582. The pick finger and presser foot mechanisms carried by the lever 582 on the right of the mandrel former function substantially as does the mechanism carried by the lever 580, except that the various movements of the parts are timed so as to coordinate with the movement of the cord laying mechanism across the mandrel former.

Just as one of the essential factors in laying the first layers of cord (as described in connection with unit B) was that they shall be placed under a uniform tension which uniformity of tension was obtained as a result of the manner in which the bead rings were associated therewith, so also in connection with unit C for laying the second group of cord layers it is an essential factor that the cords shall be layed under a uniform tension and this, I attain by the manner in which I have timed the functioning of the pick finger and presser foot mechanisms and the cord laying mechanisms, and upon comparing Figures 62 to 64 inclusive, it will be observed that except for the short period of time necessary for the movement of a pick finger from its position adjacent to bead to a position in engagement with the cord, the cord terminals of each run are either fixed to the bead ring, or held under the desired tension by the pick finger or presser foot mechanism, and that during such short period when it is not so fixed or so held, the cord is held under proper tension by the needle 532.

I have already described the drive of the mandrel 10 through the gears 513, 517, etc., and as will be understood as Fig. 75 is consulted, this drive is so arranged as not to interfere with the removal of the mandrel 10, at least as far as the drive is concerned.

The pick finger and presser foot mechanism is so supported, however, as to present itself in the path of the removal of the mandrel, and for this purpose I have made the rods 566 and 569 sectional, as is clearly shown in Fig. 59 of the drawing, in which the lower sections 726 and 727 are dovetailed on to the upper sections, as shown in 728 and 729, which sections are supported in the bracket 732 shown more clearly in Fig. 75, which bracket is hinged at 733 upon the support 734.

It is therefore clear that when it is desired to remove the mandrel, that a movement of the bracket 732 about the hinge 733 will carry with it the sections 726 and 727, and the rest of the pick finger and presser foot mechanism will be supported within the confines of the mandrel 10, so that its free removal is not interfered with.

Having thus described my invention and illustrated its use, what I claim as new and desire to secure by Letters Patent is—

1. In a machine of the character described, in combination, a mandrel means for moving a continuous cord length to and fro across the mandrel, movable means for engaging the cord at a point inwardly of its extreme traverse whereby upon the return movement of the cord laying means a loop will be formed at the point of engagement of the cord by the engaging means and means for moving said engaging means toward the mandrel whereby the loop end of the cord will be similarly moved and means for pressing said loop end into contact with the mandrel.

2. In a machine of the character described, in combination, a mandrel, means for laying a cord to and fro across the mandrel, including a needle carrier mounted for reciprocation, and means for reciprocating said needle including guiding means fixed to the machine and a member movable with the needle carrier, shifting racks, means for shifting one rack from the other including separate gears in mesh with the rack.

3. In a machine of the character described in combination, a mandrel, means for laying a cord to and fro across the mandrel including a needle carrier mounted for reciprocation, and means for reciprocating said needle including guiding means fixed to the machine and a member movable with the needle carrier, shifting racks, means for shifting one rack from the other, including separae gears in mesh with the rack, said gears being arranged to rotate as a unit.

4. In a machine of the character described, in combination, a mandrel, means for laying a cord to and fro across the mandrel, including a needle carrier mounted for reciprocation, and means for reciprocating said needle including guiding means fixed to the machine and a member movable with the needle carrier, shifting racks, means for shifting one rack from the other, including separate gears in mesh with the rack, said gears being arranged to rotate as a unit, and said gears being shiftable, out of meshing engagement with the racks as a unit, so as to permit of changing their ratios.

5. In a machine of the character described, in combination, a mandrel, means for laying cords to and fro across the mandrel, and means for applying a bead to the cord so laid, said mechanism being shiftable to and from operative association with the mandrel, and in a direction diametrically of the mandrel, and including an annular bead holding member having a portion thereof movable out of the line of curvature thereof.

6. In a machine of the character described, in combination, a mandrel, means for laying cords to and fro across the mandrel, and means for applying a bead to the cord so laid, said mechanism being shiftable to and from operative association with the mandrel, and in a direction diametrically of the mandrel, and including an annular bead holding member having a portion thereof pivoted thereto, so as to permit the bead applying mechanism to be moved into operative association with the mandrel.

7. In a machine of the character described, in combination, a mandrel, means for laying cords to and fro across the mandrel, and mechanisms for applying a bead to the cords so laid including a bead ring holding member, means for moving said member with and out of the predetermined association with the mandrel for laying the bead ring, and means automatically operative upon the movement of said member out of operative association to cause the bead ring to be removed from the member.

8. In a machine of the character described, in combination, a mandrel, means for laying cords to and fro across the mandrel, and mechanisms for applying a bead to the cords so laid including a bead ring holding member, means for moving said member with and out of the predetermined association with the mandrel, for laying the bead ring and means automatically operative upon the movement of said member out of operative association to cause the bead ring to be removed from the member, said last mentioned means including a member movable axially of the mandrel.

9. In a machine of the character described, in combination, a mandrel, means for laying cords to and fro across the mandrel, and mechanisms for applying a bead to the cords so laid including a bead ring holding member, means for moving said member with and out of the predetermined association with the mandrel for laying the bead ring and means automatically operative upon the movement of said member out of operative association to cause the bead ring to be removed from the member, said last mentioned means including a member movable relatively to the bead ring holding member and axially of the mandrel.

10. In a machine of the character described, in combination, a mandrel, means for laying cords to and fro across the mandrel, and mechanisms for applying a bead to the cords so laid including a bead ring holding member, means for moving said member with and out of the predetermined association with the mandrel for laying the bead ring, and means automatically operative upon the movement of said member out of operative association to cause the bead ring to be removed from the member, said last mentioned means including a plunger movable axially of the mandrel.

11. In a machine of the character described, in combination, a mandrel, means for laying cords to and fro across the mandrel, and mechanisms for applying a bead to the cords so laid including a bead ring holding member, means for moving said member with and out of the predetermined association with the mandrel for laying the bead ring, and means automatically operative upon the movement of said member out of operative association to cause the bead ring to be removed from the member, said last mentioned means including a spring pressed plunger movable axially of the mandrel.

12. In a machine of the character described, in combination, a mandrel, means for laying cords to and fro across the mandrel, and mechanisms for applying a bead to the cords so laid including a bead ring holding member, means for moving said member with and out of the predetermined association with the mandrel for laying the bead ring, and means automatically operative upon the movement of said member out of operative association to cause the bead ring to be removed from the member, said last mentioned means including a spring pressed plunger movable axially of the mandrel and relatively to the beading holding member.

13. In a machine of the character described, in combination, a mandrel, and mechanism for applying a bead to the mandrel, including a bead ring holding member, means for moving said member with and out of the predetermined association with the mandrel for laying the bead ring and means automatically operative upon the movement of said member out of operative association to cause the bead ring to be removed from the member.

14. In a machine of the character described, in combination, a mandrel, and mechanism for applying a bead to the mandrel, including a bead ring holding member, means for moving said member with and out of the predetermined association with the mandrel, for laying the bead ring and means automatically operative upon the movement of said member out of operative association to cause the bead ring to be removed from the member, said last mentioned means including a member movable axially of the mandrel.

15. In a machine of the character described, in combination, a mandrel, and mechanism for applying a bead to the mandrel, including a bead ring holding member, means for moving said member with and out of the predetermined association with the mandrel for laying the bead ring and means automatically operative upon the movement of said member out of operative association to cause the bead ring to be removed from the member, said last mentioned means including a member movable relatively to the bead ring holding member and axially of the mandrel.

16. In a machine of the character described, in combination, a mandrel, and mechanism for applying a bead to the mandrel, including a bead ring holding member, means for moving said member with and out of the predetermined association with the mandrel for laying the bead ring, and means automatically operative upon the movement of said member out of operative association to cause the bead ring to be removed from the member, said last mentioned means including a plunger movable axially of the mandrel.

17. In a machine of the character described, in combination, a mandrel, and mechanisms for applying a bead to the mandrel, including a bead ring holding member, means for moving said member with and out of the predetermined association with the mandrel for laying the bead ring, and means automatically operative upon the movement of said member out of operative association to cause the bead ring to be removed from the member, said last mentioned means including a spring pressed plunger movable axially of the mandrel.

18. In a machine of the character described, in combination, a mandrel, and mechanisms for applying a bead to the mandrel, including a bead ring holding member, means for moving said member with and out of the predetermined association with the mandrel for laying the bead ring, and means automatically operative upon the movement of said member out of operative association to cause the bead ring to be removed from the member, said last mentioned means including a spring pressed plunger movable axially of the mandrel and relatively to the bead holding member.

19. In a machine of the character described, in combination, a mandrel, and mechanisms for applying bead rings to the cord carcass thereon, including bead ring holding members positioned on opposite sides of the mandrel, said members being shiftable as a unit into position on both sides of the mandrel, and then movable toward and away from each other and toward and away from the mandrel for laying the bead rings and axially movable means for preventing the bead rings carried by said members from moving with and away from the mandrel with the members.

20. In a machine of the character described, in combination, a mandrel, and mechanisms for applying bead rings to the cord carcass thereon, including bead ring holding members positioned on opposite sides of the mandrel, said members being shiftable as a unit into position on both sides of the mandrel, and then movable simultaneously toward and away from each other and toward and away from the mandrel for laying the bead rings and axially movable means for preventing the bead rings from moving with the members as the members move away from the mandrel.

21. In a machine of the character described, in combination, a mandrel, and mechanism for applying bead rings to the cord carcass on the mandrel, said mechanism including bead ring holding members positioned on opposite sides of the mandrel and shiftable toward and away from the mandrel and axially movable means for preventing the return movement of the bead rings with the holding members.

22. In a machine of the character described, in combination, a mandrel, and mechanism for applying bead rings to the cord carcass on the mandrel, said mechanism including bead ring holding members positioned on opposite sides of the mandrel and shiftable toward and away from the mandrel, and axially movable means for preventing the return movement of the bead rings with the holding members.

23. In a machine of the character described, in combination, a mandrel, and mechanisms for applying bead rings to the cord carcass thereon, including bead ring holding members positioned on opposite sides of the mandrel, said members being shiftable as a unit into position on both sides of the mandrel, and then movable toward and away from each other and toward and away from the mandrel for laying the bead rings, and means for preventing the bead rings carried by said members from moving with and away from the mandrel with the members, said last mentioned means including a spring pressed plunger.

24. In a machine of the character described, in combination, a mandrel, and mechanisms for applying bead rings to the cord carcass thereon, including bead ring holding members positioned on opposite sides of the mandrel, said members being shiftable as a unit into position on both sides of the mandrel, and then movable simultaneously toward and away from each other and toward and away from the mandrel for laying the bead rings and means for preventing the bead rings from moving with the members as the members move away from the mandrel, said last mentioned means including a spring pressed plunger.

25. In a machine of the character described, in combination, a mandrel, and mechanisms for applying bead rings to the cord carcass thereon, including bead ring holding members positioned on opposite sides of the mandrel, said members being shiftable as a unit into position on both sides of the mandrel, and then movable toward and away from each other and toward and away from the mandrel for laying the bead rings, and automatically operative means for preventing the bead rings carried by said members from moving with and away from the mandrel with the members, said last mentioned means including a spring pressed plunger.

26. In a machine of the character described, in combination, a mandrel, and mechanism for applying bead rings to the cord carcass on the mandrel, said mechanism including bead ring holding members positioned on opposite sides of the mandrel and shiftable toward and away from the mandrel, and means for preventing the return movement of the bead rings with the holding members, said last mentioned means including a spring pressed plunger.

27. The method of making cord tires by laying a cord back and forth across a mandrel, which consists in associating a bead ring with the laid cords inwardly of an end thereof with such end projecting beyond the bead ring and then associating such end with the bead rings by applying pressure thereto and producing a relative movement between the mandrel and the point of application of such pressure.

28. In a machine of the character described, in combination, a mandrel, means for laying a cord to and fro across the mandrel, means for applying a bead ring to the cords thus laid and means for associating the cord ends with such bead ring, both of said means being shiftable to and from the mandrel.

29. In a machine of the character described in combination, a mandrel, means for laying a cord to and fro across the mandrel, means for applying a bead ring to the cords thus laid and means for associating the cord ends with such bead ring, both of said means being shiftable to and from the mandrel successively.

30. In a machine of the character described, in combination, cord laying means, bead ring applying means and means for associating the cord ends about the bead ring said last mentioned means being shiftable to and from the mandrel.

31. In a machine of the character described, in combination, cord laying means, bead ring applying means and means for associating the cord ends about the bead ring said last mentioned means being shiftable to and from the mandrel and rotatable relatively thereto.

32. In a machine of the character described in combination, cord laying means, bead ring applying means and means for associating the cord ends about the bead ring, said last mentioned means being shiftable toward the mandrel as said means are giving a rotation relatively thereto.

33. In a machine of the character described, in combination, a mandrel and means for applying a bead ring thereto, said means including a rotary member, said means being shiftable into association with the mandrel, when the member occupies a predetermined angular position.

34. In a machine of the character described, in combination, a mandrel and means for applying a bead ring thereto, said means including a rotary member, said means being shiftable into association with the mandrel, when the member occupies a predetermined angular position, and means for preventing such shifting if the member is not in said angular predetermined position.

35. In a machine of the character described, in combination, a mandrel and means for applying a bead ring thereto, said means including a rotary member, said means being shiftable into association with the mandrel, when the member occupies a predetermined angular position, and means for preventing such shifting if the member is not in said angular predetermined position including an element movable as said member is rotated.

36. In a machine of the character described, in combination, a mandrel and means for applying a bead ring thereto, said means including a rotary member, said means being shiftable into association with the mandrel, when the member occupies a predetermined angular position, including a member shiftable into and out of cooperation with a relatively fixed part of the machine.

37. In a machine of the character described, in combination, a mandrel, means for laying a continuous length of cords to and fro across a mandrel, means for engaging and moving the cord end toward the mandrel, and means for pressing the cord against into association with the mandrel including a member movable to and from position about the cord and a member movable to complete the engagement of said engaging means about the cord.

38. In a machine of the character described, in combination, a mandrel, means for laying a continuous length of cords to and fro across a mandrel, means for engaging and moving the cord end toward the mandrel, and means for pressing the cord against into association with the mandrel comprising an open channel member in which the cord is laid and a member movable to close the channel in said member.

In witness whereof, I have hereunto signed my name, this 7th day of June, 1924.

FRANK H. STEWART.